(12) United States Patent
Nozaki et al.

(10) Patent No.: US 8,120,664 B2
(45) Date of Patent: Feb. 21, 2012

(54) DIGITAL CAMERA

(75) Inventors: Hirotake Nozaki, Tokyo (JP); Yasuyuki Motoki, Kawasaki (JP); Hideo Hibino, Yamoto (JP); Tadashi Ohta, Yokohama (JP)

(73) Assignee: Nikon Corporation, Tokyo (JP)

( * ) Notice: Subject to any disclaimer, the term of this patent is extended or adjusted under 35 U.S.C. 154(b) by 1720 days.

(21) Appl. No.: 11/050,909

(22) Filed: Feb. 7, 2005

(65) Prior Publication Data

US 2005/0174451 A1 Aug. 11, 2005

(30) Foreign Application Priority Data

| Feb. 6, 2004 | (JP) | ................................... 2004-030061 |
| Feb. 6, 2004 | (JP) | ................................... 2004-030062 |
| Feb. 6, 2004 | (JP) | ................................... 2004-030063 |
| Feb. 6, 2004 | (JP) | ................................... 2004-030064 |

(51) Int. Cl.
*H04N 5/235* (2006.01)

(52) U.S. Cl. .................. 348/222.1; 348/230.1

(58) Field of Classification Search .............. 348/222.1, 348/240.99, 207.99, 220.1, 229.1, 230.1
See application file for complete search history.

(56) References Cited

U.S. PATENT DOCUMENTS

| 5,392,088 A | 2/1995 | Abe et al. |
| 5,512,974 A | 4/1996 | Abe et al. |
| 5,526,088 A | 6/1996 | Kusaka |
| 5,905,919 A | 5/1999 | Ide |
| 5,982,912 A | 11/1999 | Fukui et al. |
| 6,130,417 A * | 10/2000 | Hashimoto ................ 250/201.2 |
| 6,157,783 A | 12/2000 | Ide |
| 7,242,434 B2 * | 7/2007 | Sugimoto et al. .............. 348/349 |
| 7,358,988 B1 * | 4/2008 | Konishi et al. .............. 348/222.1 |
| 7,526,139 B2 * | 4/2009 | Yamakado et al. ........... 382/264 |
| 2003/0025812 A1 | 2/2003 | Slatter |
| 2003/0071908 A1 | 4/2003 | Sannoh et al. |
| 2003/0185424 A1 | 10/2003 | Sato et al. |
| 2005/0012833 A1 | 1/2005 | Yokota et al. |

FOREIGN PATENT DOCUMENTS

| JP | A-5-37940 | 2/1993 |
| JP | A-5-41830 | 2/1993 |
| JP | A-6-153047 | 5/1994 |
| JP | A-6-303491 | 10/1994 |
| JP | A-7-222049 | 8/1995 |
| JP | A-8-294036 | 11/1996 |
| JP | A-294038 | 11/1996 |
| JP | A-9-9128 | 1/1997 |

(Continued)

*Primary Examiner* — David Ometz
*Assistant Examiner* — Peter Chon
(74) *Attorney, Agent, or Firm* — Oliff & Berridge, PLC

(57) ABSTRACT

This invention includes an imaging device that photographs a subject, a display device that has a display screen displaying image data photographed by the imaging device, a zoom device that varies the display screen, an extraction device that extracts a predetermined feature portion from image data photographed by the imaging device, a directive device that directs the display device so as to display a predetermined feature portion extracted by the extraction device in a predetermined form, and a controller that controls the directive device so as not to direct a display on the display device in accordance with the varying magnification of the zoom device. Namely, an icon of the extraction result is not displayed while the zoom is in action, so that it can avoid an inappropriate display in which the icon display does not correspond to a photographed subject due to the subject's quick movement or a sudden change in its size within a picture frame.

2 Claims, 22 Drawing Sheets

FOREIGN PATENT DOCUMENTS

| | | |
|---|---|---|
| JP | A-9-233384 | 9/1997 |
| JP | A-9-307870 | 11/1997 |
| JP | A 10-232934 | 9/1998 |
| JP | A-11-8788 | 1/1999 |
| JP | A-11-146405 | 5/1999 |
| JP | A-11-252450 | 9/1999 |
| JP | A-2000-23020 | 1/2000 |
| JP | A-2000-99691 | 4/2000 |
| JP | A-2000-115597 | 4/2000 |
| JP | A-2001-309225 | 2/2001 |
| JP | A-2001-215403 | 8/2001 |
| JP | A-2001-268425 | 9/2001 |
| JP | A-2002-44489 | 2/2002 |
| JP | A-2002-51255 | 2/2002 |
| JP | A-2002-171520 | 6/2002 |
| JP | A-2002-232761 | 8/2002 |
| JP | A-2002-236913 | 8/2002 |
| JP | A-2002-296489 | 10/2002 |
| JP | A-2002-298138 | 10/2002 |
| JP | A-2002-298142 | 10/2002 |
| JP | A 2002-333652 | 11/2002 |
| JP | A-2003-30647 | 1/2003 |
| JP | A-2003-32615 | 1/2003 |
| JP | A-2003-32616 | 1/2003 |
| JP | A-2003-60956 | 2/2003 |
| WO | WO 00/38414 | 6/2000 |

* cited by examiner

DIGITAL CAMERA

INCORPORATION BY REFERENCE

This application is based upon and claims priority of Japanese Patent Applications No.2004-030061 filed on Feb. 6, 2004, No.2004-030062 filed on Feb. 6, 2004, No.2004-030063 filed on Feb. 6, 2004, No.2004-030064 filed on Feb. 6, 2004, the contents being incorporated herein by reference.

BACKGROUND OF THE INVENTION

1. Field of the Invention

The present invention relates to a digital camera that identifies a feature of a person and implements a focus and exposure actions responsive to a result of its identification.

2. Description of Related Art

Generally, it has been known so far that many technologies which identify a person from image data including a system in which a person is verified by checking it against the fingerprint or iris registered in advance. Japanese Laid-Open Patent Application H9-251534 describes in detail an identification method in which an eye, nose and mouth etc are registered as a feature by extracting the eye, nose and mouth etc and then, identity is verified by comparing the registered feature with a feature extracted from input image data and Japanese Laid-Open Patent Application H10-232934 discloses a way of enhancing an accuracy of an image database dictionary when registering such the extracted feature. Some of examples in which these technologies have been applied to a camera will be given hereunder.

Japanese Laid-Open Patent Application 2001-201779 discloses a camera in which a camera user was registered beforehand as reference information, and a camera can be put into action only when identification information input by photographing the camera user with a camera pointing at its face meets the registered reference information. Japanese Laid-Open Patent Application 2001-309225 disclosed a camera in which data such as a face coordinate, face dimension, a position of an eye, a pause of a head and the like recognized by a face recognition algorithm is stored on an image memory along with image data. Japanese Laid-Open Patent Application 2001-326841 also discloses an imaging apparatus (a digital camera) that stores identification information (face, fingerprint and palm print) to identify an authentic user beforehand. Japanese Laid-Open Patent Application 2002-232761 also discloses an image storage apparatus that stores a photographed image by linking the photographed image to previously read identification information about a subject. Japanese Laid-Open Patent Application 2002-333652 discloses an imaging apparatus that compares previously stored profile information with photographed face information and generates a storage signal. This profile information is stored together with a priority order.

SUMMARY OF THE INVENTION

In the foregoing conventional various inventions that apply technologies identifying a subject to a camera, these conventional technologies employed in the large computer including the imaging apparatus for capturing the subject are the technologies so as to be achievable in a camera alone. But, on the other hand, when a picture is actually photographed with a camera alone using a subject-identification technology, an unprecedented action sequence as a digital camera is needed.

With adoption of an all-new action sequence, a present invention aims at providing a digital camera having a closer-to-conventional action sequence and easy-of-use subject identification function that has not been achieved in the cameras having conventional subject identification functions, which have been disclosed so far.

In order to solve the foregoing problem, an invention includes an imaging device that photographs a subject, a display device that has a display screen displaying image data photographed by the imaging device, a zoom device that varies the display screen, an extraction device that extracts a predetermined feature portion from image data photographed by the imaging device, a directive device that directs the display device so as to display a predetermined feature portion extracted by the extraction device in a predetermined form, and a controller that controls the directive device so as not to direct a display on the display device in accordance with the varying magnification of the zoom device. Namely, an icon of the extraction result is not displayed while the zoom is in action, so that it can avoid an inappropriate display in which the icon display does not correspond to a photographed subject due to the photographed subject's quick movement or a sudden change in its size within a picture frame.

The invention wherein the zoom device is an optical zoom device which optically varies an image magnification of the imaging device, and the invention wherein the zoom device is an electric zoom device which electrically varies the display screen. The invention wherein the controller further controls so as not to display by way of the directive device throughout a period of time during which the zoom device varies the display screen. Namely, the icon is configured not to be displayed only while the zoom is in action.

An invention includes an imaging device that photographs a subject, a display device that has a display screen displaying image data photographed by the imaging device, a zoom device that varies the display screen, an extraction device that extracts a predetermined feature portion from image data photographed by the imaging device, and a controller that controls the extraction device not to extract the predetermined feature portion in accordance with the varying magnification of the zoom device. With this, as the action of the feature extraction is halted during the zoom action, it enables to make other computing cycle for AF and AE faster by that. The invention further includes a directive device that directs the display device to display a feature portion extracted by the extraction device in a predetermined form, wherein the controller further controls so as not to display on the display device by way of the directive device in accordance with the varying magnification of the zoom device, and the icon display is brought to a halt with the halt of the extraction action.

The invention wherein the zoom device is an optical zoom device that optically varies an image magnification of the imaging device and the invention wherein the zoom device is an electric zoom device that electrically varies the display screen. The invention wherein the controller further controls so as not to display by way of the directive device while the zoom device varies the display screen. Namely, the icon is configured not to be displayed only while the zoom is in action.

An invention includes an imaging device that has an image-taking lens photographing a subject, a zoom device that varies a focal length of the image-taking lens, a detecting device that that detects information about a focal length of the image-taking lens varied by the zoom device, an extraction device that extracts a predetermined feature portion from a predetermined extraction area within image data photographed by imaging device, and a prediction device that predicts a size of a feature portion corresponding to the information about the focal length detected by the detecting device. With this, it turns out to enable to efficiently determine an area to extract a feature. The invention further includes a directive device that directs so as to drive the zoom device, a storing device that stores a size of a feature portion extracted by the extraction device before the directive device directs, wherein the prediction device predicts information about each focal length of the image-taking lens detected by the detecting device right before the image-taking lens starts driving and right after the lens driving is ended by way of the directive device, and a size of a feature portion at a time when the image-taking lens driving is ended by the directive device from a size of a feature portion stored on the storing device. Namely, the size of the feature at the time of ending the movement can be predicted based upon the focal length of the lens before and after the movement thereof. The invention further includes a controller that controls the extraction device so as not to extract the predetermined feature portion while the image-taking lens is driven. Thus, the feature extraction can be halted during the zoom action. The invention further includes a setting device that sets a predetermined range including a predetermined feature portion as an extraction area after the extraction device extracts the predetermined feature portion within an extraction area set in advance. Namely, once the predetermined feature is extracted, a setting of a narrower range including this feature as the extraction area thereafter enables a quick feature extraction. The invention wherein the setting device sets so as to make an extraction area right after driving of the zoom device is ended identical to an extraction area right before the zoom device starts its driving when the directive device directs the zoom device so as to zoom down. Namely, when the lens is zoomed down, the size of the subject becomes small and a moving direction is unclear and thus, setting of the same area as set prior to the zoom enables to prevent the subject from being out of the extraction area.

The invention further includes a setting device that sets a size of the extraction area based upon a size of a feature portion predicted by the prediction device. The invention wherein the setting device further sets the extraction area at a center portion of an image-taking screen. The reason of this setting is that there are many cases where the subject will be positioned at the center of the picture area when the lens is zoomed up.

An invention includes an imaging device that has an image-taking lens to photograph a subject, a zoom device that varies a focal length of the image-taking lens, an extraction device that extracts a predetermined feature portion from a predetermined area within image data photographed by the imaging device, and a selecting device that selects the predetermined area in accordance with a varying magnification of the zoom device. With this, a suitable extraction area can be set when the zoom is in action. The invention wherein the selecting device selects a narrower area than an area selected at a time when the image-taking lens is put into out of action for varying the magnification while a focal length of the image-taking lens is in action for varying the magnification by way of the zoom device, so that the invention can shorten an extraction time by extracting from the narrower area when the zoom is in action. The invention wherein the selecting device further selects an area in the vicinity of the center portion of the image-taking screen. Namely, the extraction time can be shortened by using the fixed area around the center of the screen when the zoom is in action. The invention further includes an identifying device that identifies a subject corresponding to a feature portion extracted by the extraction device and the selecting device selects an area of a predetermined range including a subject identified by the identifying device while a focal length of the image-taking lens is in action for varying the magnification by way of the zoom device, so that the extraction time can be shortened. An invention includes a directive device that directs to retain a shooting condition at a time of shooting a subject, an extraction device that extracts a predetermined section from taken image data, and a controller that controls so as to retain an extraction result obtained by the extraction device in accordance with a directive of the directive device. With this, the picture subject is determined and the extraction result is locked at the same time when the shooting condition is locked through halfway depressing the shutter button and the like, so the extraction result at the time of halfway depressing the shutter button is retained thereafter. The invention wherein the extraction result is at least either information of a size or information of a position about a feature portion extracted by the extraction device. The invention further includes a display device that displays the predetermined feature portion extracted by the extraction device in a predetermined display form, and the controller controls the display device so as to retain the display form, so that the picture subject can be readily checked through the icon display and so. The invention further includes a focusing device that implements a focus action at a time of shooting a subject, wherein the shooting condition is a condition about a focus position determined by the focusing device. The invention further includes a setting device that sets a predetermined area including the predetermined feature portion extracted by the extraction device as a distance measuring area used at a time when the focusing device implements a focus action.

The invention further includes a metering device that meters subject brightness, wherein the shooting condition is subject brightness metered by the metering device. The invention further includes a setting device that sets a predetermined area including the predetermined feature portion extracted by the extraction device as a metering area used at a time when the metering device implements a meter action. The invention wherein the controller further controls the extraction device so as to repeat an extraction action until the directive device directs. Namely, the extraction action is repeated until the shutter button is halfway depressed. The invention further includes a setting device that sets any of an action mode for putting the extraction device into action or an out-of-action mode for putting the extraction device into out of action, wherein the predetermined period of time is a period of time from a setting of the extraction device to an action mode by way of the setting device to a directive by way of the directive device. Namely, the predetermined period of time is the period of time from the time of setting the extraction action up to the time of halfway depressing the shutter button. The invention further includes a power-on device that turns on a power of the digital camera, wherein the predetermined period of time is a period of time from a time that the power-on device turns on the digital camera to a time that the directive device directs. Namely, the predetermined period of time is the period of time from the time of turning on the power to the time of halfway depressing the shutter button.

An invention includes a directive device that directs to retain a shooting condition at a time of shooting a subject, an extraction device that extracts a predetermined feature portion from taken image data, and a controller that controls so as to halt an extraction action of the extraction device in accordance with a directive of the directive device. Namely, the halt of the extraction action in itself after halfway depressing the shutter button enables to put the extraction device into non-action.

An invention includes a focusing device that implements a focus action at a time of shooting a subject, an extraction device that extracts a predetermined feature portion from a predetermined area within the image data, a directive device that directs the focusing device to start a focus action and, when a focus position is obtained by a focus action of the focusing device in accordance with a directive of the directive device, a selecting device that selects any of a first focus mode for retain the focus position, and a second focus mode for repeating a focus action in accordance with a directive of the directive device, and a controller that controls the extraction device so as to implement an extraction action corresponding to a selection result of the selecting device in accordance with a directive of the directive device. Namely, the extraction device can be controlled so as to implement the extraction action suitable for the AF mode selected based upon halfway depressing of the shutter button.

The invention wherein the controller controls so as to retain an extraction result by way of the extraction device when the selecting device selects the first focus mode, and the controller controls so as to repeat an extraction action by way of the extraction device when the selecting device selects the second focus mode. The invention further includes a setting device that sets a predetermined area including the predetermined feature portion extracted by the extraction device as a distance measuring area used at a time when the focusing device implements a focus action, and the invention further includes a metering device that meters subject brightness, and a setting device that sets a predetermined area including the predetermined feature portion extracted by the extraction device as a metering area used at a time when the metering device implements a metering action. An invention includes a metering device that implements a metering action at a time of shooting a subject, an extraction device that extracts a predetermined feature portion from a predetermined area within image data, a directive device that directs the metering device so as to start a metering action, a selecting device that selects any of a first metering mode for retaining a metering result of the metering device and a second metering mode for repeating a metering action in accordance with the directive of the directive device, and a controller that controls the extraction device so as to implement an extraction action corresponding to a selection result of the selecting device in accordance with the directive of the directive device. Namely, the extraction device can be controlled so as to implement the extraction action suitable for the metering mode selected based upon halfway depressing of the shutter button. An invention includes a setting device that sets any of a continuous shooting mode for continuously shooting a subject image and other shooting mode, an extraction device that extracts a predetermined feature portion from taken image data, a directive device that directs the metering device so as to start a metering action, and a controller that controls the extraction device so as not to extract the predetermined extraction section while the continuous shooting mode is being set by the setting device. Namely, when continuously shooting, while the computations of the AF and AE actions can be implemented at the same cycle as in the other shooting mode by halting the extraction action, a work load of the CPU used in the digital camera accompanying with the extraction process can be also reduced. The invention wherein the predetermined period of time is a period of time that the continuous shooting mode is being set. The invention further includes a shooting directive device that directs to start shooting a subject, wherein the predetermined period of time is a period of time from a start of shooting the subject up to an end of the shooting in accordance with the directive of the shooting directive device.

Namely, the predetermined period of time is the period of time that the picture is actually being photographed. The invention wherein the continuous shooting mode is a motion image-taking mode that takes a motion image of the subject, and the invention wherein the continuous shooting mode is a consecutive image-taking mode that takes a still image of the subject consecutively. The invention wherein an extraction of the predetermined feature portion is that the extraction device extracts a candidate assumed to be a feature portion from taken image data. Namely, the extraction action is to detect a position, a size and a number of the person(s) from the data of the photographed image. The invention wherein the extraction of the predetermined feature portion is that the extraction device extracts a candidate assumed to be a feature portion from taken image data and further judges a feature portion corresponding to a particular subject. With this, eventually the subject that the photographer seeks for is detected.

An invention includes a first setting device that sets any of a continuous shooting mode for continuously shooting a subject image and other shooting mode, an extraction device that extracts a predetermined feature portion from taken image data, a second setting device that sets any of an extraction action mode for setting so as to put the extraction device into action and other action mode, and a controller that controls the extraction device so as not to extract the predetermined feature portion during a predetermined period of time that the continuous shooting mode is being set by the first setting mode at a time when the extraction mode is set by the second setting device. Namely, the extraction action is halted in a case where the continuous shooting is being set even when the extraction action is set, so that the shooting with priority put on the continuous shooting can be implemented. The invention wherein the predetermined period of time is all the time that the continuous shooting mode is being set by the first setting mode. The invention further includes a shooting directive device that directs to start shooting a subject, wherein the predetermined period of time is a period of time from a start of shooting the subject up to an end of the shooting in accordance with the shooting directive of the shooting directive device.

An invention includes a setting device that sets any of a continuous shooting mode for continuously shooting a subject image and other shooting mode, an extraction device that extracts a predetermined feature portion from a predetermined area within taken image data, and a controller that controls the extraction device so as to extract the predetermined feature portion from an area different from an area used at a time when the other shooting mode is set during a predetermined period of time that the continuous shooting mode is being set by the setting mode. Namely, while the continuous shooting mode is set, the feature is extracted from the area different from the area set at the other shooting mode, so that the extraction device can be caused to implement the extraction action by not affecting the typical action sequence of the digital camera as much as possible.

The invention wherein the predetermined period of time is a period of time that the continuous shooting mode is being set by the setting device. The invention further includes a shooting directive device that directs to start shooting a subject, wherein the predetermined period of time is a period of time from a start of shooting the subject up to an end of the shooting in accordance with the shooting directive of the shooting directive device. The invention wherein the different area is a narrower area than an area selected at the other shooting mode. This can shorten the time needed to extract. The invention further includes a judging device that judges a subject, wherein the different area is within a predetermined area including a subject judged by the judging device. Namely, as the extraction is limited to the area around the subject, the time needed to extract can be shortened.

An invention includes an extraction device that extracts a predetermined feature portion from taken image data, a shooting directive device that directs to start shooting a subject, a controller that controls the extraction device so as not to extract the predetermined feature portion when the shooting directive device directs to start shooting the subject. Namely, processing for the storage can be expedited by halting the extraction action while the subject is actually photographed.

An invention includes an imaging device that photographs a subject image, a directive device that directs a shooting start, and an extraction device that extracts a predetermined feature portion from image data rather than image data output from the imaging device in accordance with the directive of the directive device. Namely, as the extraction is not implemented by use of the image for the storage, the processing for the storage can be expedited. The invention further includes a detachable storage device that stores image data, wherein image data output from the imaging device is stored on the storage device in accordance with the directive device. The invention further includes a display device that displays image data continuously shot by the imaging device, wherein image data rather than image data output from the imaging device in accordance with the directive of the directive device is image data for displaying on the display device which is continuously shot by the imaging device.

An invention includes an imaging device that photographs a subject, an extraction device that extracts a predetermined feature portion within image data output from the imaging device, a judging device that judges brightness of the subject, and a controller that controls the extraction device in accordance with the brightness of the subject judged by the judging device. Namely, the extraction device can implement the best possible extraction action every time because the extraction method of the extraction device is changed in accordance with the brightness of the subject. The invention wherein the controller controls the extraction device so as to halt the extraction of the feature portion when the judging device judges that the brightness of the subject is below a predetermined brightness. Namely, when the subject brightness is low, the wrong extraction can be avoided due to a decrease in a S/N ratio by halting the extraction.

The invention wherein the controller controls the extraction device so as to select an area for extracting the feature portion from taken image data in accordance with the brightness of the subject judged by the judging device. Namely, the extraction can be ensured by selecting the area different from the area to be selected for the ambient brightness when the subject is low. The invention wherein the controller controls the judging device so as to select a narrower area than an area for extracting the predetermined feature portion selected at a time when the judging device judges that the brightness of the subject is above predetermined brightness in a case where the judging device judges that the brightness of the subject is below predetermined brightness. With this, the subject can be extracted from the narrower area, so the time needed to extract can be shortened and further the accuracy of the extraction is improved.

The invention further includes an identifying device that identifies a subject corresponding to a feature portion extracted by the extraction device, wherein the controller controls the identifying device so as to select an area of a predetermined range including a subject identified by the identifying device. Namely, once the subject is detected, the subject can be continuously extracted without fail and at high speed by selecting the area around the detected area as the extraction area. The invention further includes a distance measuring device that measures a distance up to the subject by use of image data output from the imaging device, and a cycle setting device that sets an output cycle of image data output from the imaging device in order to be used by the distance measuring device to any of a first output cycle and a second output cycle longer than the first output cycle, wherein the judging device judges the brightness of the subject based upon a length of the output cycle set by the cycle setting device. The invention wherein the judging device judges that the brightness of the subject is below predetermined brightness when it is judged that an output cycle set by the cycle setting device is the second output cycle. The invention further includes a computing device that computes brightness of a predetermined area within image data output from the imaging device, wherein the judging device judges brightness of the subject based upon a computation result of the computing device. The invention further includes an illuminating device that irradiates light onto the subject at a time when the subject is shot by the imaging device, a deciding device that decides whether or not the illuminating device irradiates light onto the subject, wherein the judging device judges that brightness of the subject is below predetermined brightness when the deciding device decides to irradiate light onto the subject. The invention wherein an extraction of the predetermined feature portion is that the extraction device extracts a candidate assumed to be a feature portion from taken image data. This enables the photographer to check out all the extracted feature portions. The invention wherein extraction of the predetermined feature portion is that the extraction device extracts a candidate assumed to be a feature portion from taken image data and then judges a feature portion corresponding to a particular subject. With this, the photographer can check out the particular subject from the extracted feature portions.

An invention includes an imaging device that photographs a subject image, an extraction device that extracts a predetermined feature portion from image data output from the imaging device, an illuminating device that irradiates auxiliary light onto a subject, and a controller that controls the extraction device so as to halt an extraction by way of the extraction device at a time when the illuminating device irradiates auxiliary light. When the subject brightness is low, usually, it is necessary to shoot the subject with a flash, and the distance up to the subject is measured by irradiating auxiliary light beforehand prior to the shooting. But, when the extraction on a basis of image data irradiated by the auxiliary light is implemented, there is a case where the wrong extraction may take place, but such the case can be avoided with this. Moreover, when firing the flash, essentially, it is not necessary to take the problem to extract the subject because many cases are that the main subject is irradiated by the flash. The invention further includes a detecting device that detects subject brightness, wherein the illuminating device irradiates auxiliary light at a time when the detecting device detects that the subject brightness is below a predetermined value. The invention further includes a distance measuring device that measures a distance up to a subject, wherein the distance measuring device measures a distance up to the subject based upon auxiliary light irradiated by the illuminating device.

An invention includes an imaging device that photographs a subject image, an extraction device that extracts a predetermined feature portion from image data output from the imaging device, a selecting device that selects any of an extraction mode for putting the extraction device into action and other mode, an illuminating device that irradiates auxiliary light onto a subject, and a controller that controls the illuminating device so as to halt an irradiation of auxiliary light by way of the illuminating device when the selecting device selects the extraction mode. Namely, when the extraction mode is selected, the wrong extraction is avoided by not irradiating the auxiliary light.

An invention includes an imaging device that photographs a subject image, an extraction device that extracts a predetermined feature portion by use of image data output from the imaging device, a focusing device that implements a focus action against a subject by use of image data output from the imaging device, and a controller that controls the extraction device so as to implement an extraction action and also the focusing device so as to implement a focus action. Namely, the image data output from the imaging element used for extraction is also used for focusing. With this, the output from the imaging element can be efficiently used. The invention further includes a selecting device that selects any of an extraction mode for putting the extraction device into action and other mode, an illuminating device that irradiates auxiliary light onto a subject, and a directive device that directs to halt an illumination by way of the illuminating device when the selecting device selects the extraction mode. Namely, the wrong extraction can be avoided depending upon the subject by setting so as not to irradiate the auxiliary light in the extraction mode. The invention further includes an illuminating device that irradiates auxiliary light onto a subject, and a directive device that directs to halt an extraction by way of the extraction device when image data of a subject irradiated by the illuminating device is output from the imaging device. Namely, the extraction action can be halted when the wrong extraction might take place if the auxiliary light is irradiated.

An invention includes an imaging device that photographs a subject image, an extraction device that extracts a predetermined feature portion by use of image data output from the imaging device, a metering device that meters brightness of a subject by use of image data output from the imaging device, and a controller that controls the metering device so as to implement a metering action along with controlling the extraction device so as to implement an extraction action by use of image data output from the imaging device at a predetermined time. Namely, the image data output from the imaging element used for extraction is also used for metering. With this, the output from the imaging element can be efficiently used. An invention includes an imaging device that photographs a subject image, an extraction device that extracts a predetermined feature portion from image data output from the imaging device, an illuminating device that irradiates auxiliary light onto a subject, and a controller that controls the extraction device so as to extract a predetermined feature portion from a subject onto which auxiliary light is irradiated by the illuminating device. Namely, the feature portion can be more surely extracted with the irradiation of the auxiliary light. The invention wherein the illuminating device of the auxiliary light is configured to be integral with the digital camera.

An invention includes an imaging device that photographs a subject image, an extraction device that extracts a predetermined feature portion from image data output from the imaging device, an illuminating device that irradiates auxiliary light onto a subject, a judging device that judges brightness of a subject, and a directive device that directs the illuminating device to irradiate the auxiliary light when the judging device judges that the brightness of a subject is below predetermined brightness. Namely, the feature portion can be more surely extracted by irradiating the auxiliary light onto the subject when the subject brightness is low. The invention includes a setting device that sets so as to irradiate the auxiliary light, wherein the directive device directs the illuminating device so as to irradiate auxiliary light when the setting device sets to irradiate auxiliary light. Namely, the auxiliary light can be irradiated only when the auxiliary light is set so as to be irradiated. An invention includes an imaging device that photographs a subject image, an extraction device that extracts a predetermined feature portion from image data output from the imaging device, a judging device that judges an extraction result of the predetermined feature portion by way of the extraction device, a selecting device that selects a predetermined area within an image-taking screen photographed by the imaging device in accordance with a judgment result of the judging device, and a processing device that implements a predetermined process based upon data of a predetermined area selected by the selecting device. Namely, in accordance with the status of being capable of implementing the extraction or not, the predetermined process can be performed by selecting the suitable area. The invention wherein the selecting device selects an area in the vicinity of a subject corresponding to a predetermined feature portion extracted by the extraction device as the predetermined area when the judging device judges that the predetermined feature portion is extracted by the extraction device. The invention wherein the selecting device selects a particular area set in advance within an image-taking screen to be photographed by the imaging device as the predetermined area when the judging device judges that the predetermined feature portion is not extracted by the extraction device. The invention wherein the processing device is a distance measuring device that measures a distance up to a subject. The invention wherein the processing device is a metering device that meters brightness of a subject.

DETAILED DESCRIPTION OF THE PREFERRED EMBODIMENT

With reference to the accompanying drawings, embodiments of this invention will be described hereunder.

Figure 1:
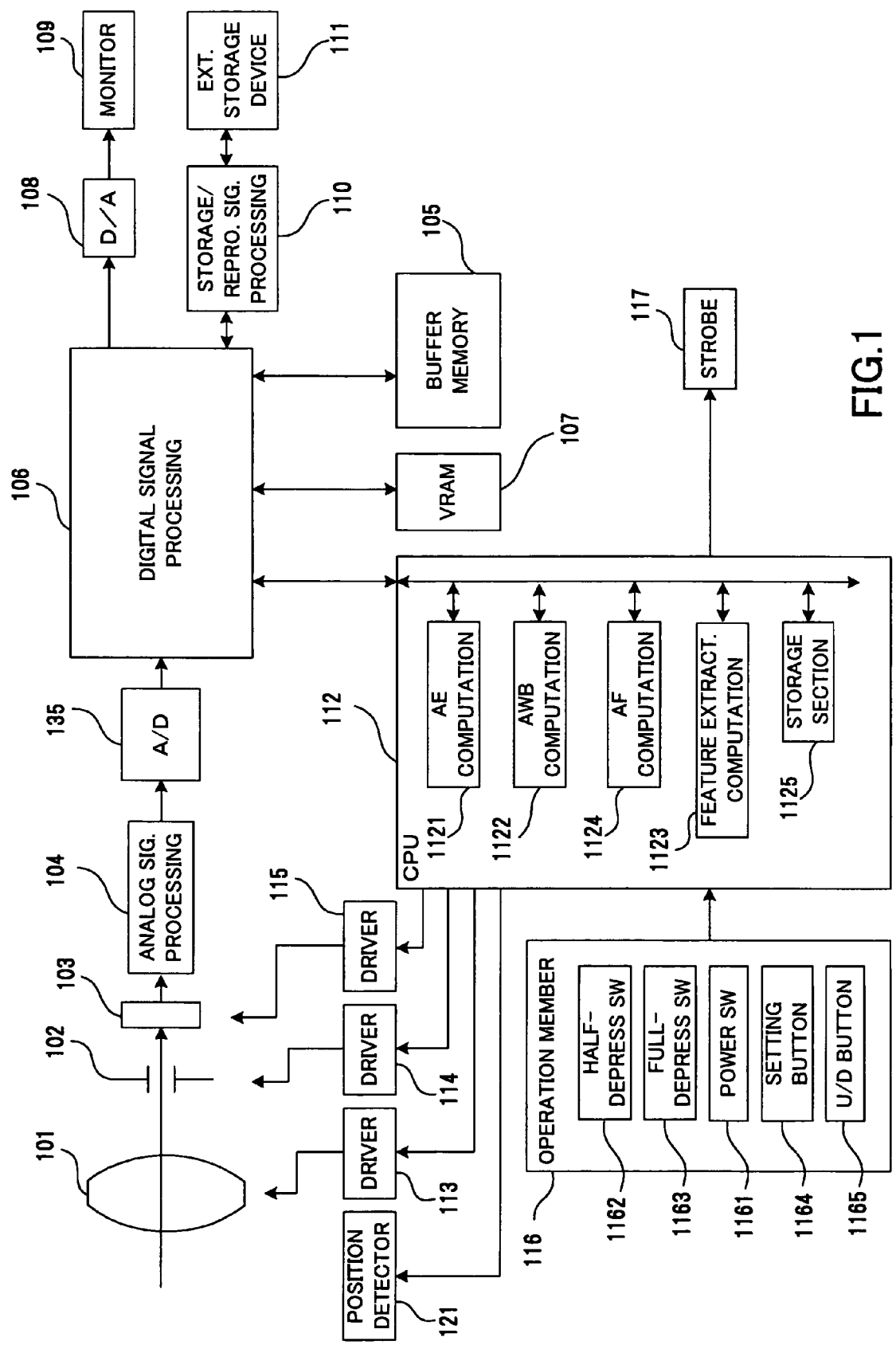
FIG. 1 is a block diagram showing a configuration of a digital camera according to the present invention.

FIG. 1 is a block view explaining a major function about a digital camera of this invention. Image-taking lens 101 includes a zoom lens that continuously changes its focal length, and a focus lens that adjusts a focus point. These lenses are driven by driver 113. Herein, driver 113 has a zoom drive unit and its drive circuit for the zoom drive and a focus drive unit and its drive circuit for the focus drive, and these units and circuits are controlled by CPU 112. Image-taking lens 101 forms a subject image on an image-forming surface of imaging element 103. Imaging element 103 is a photoelectric imaging element that outputs an electric signal responsive to a light intensity of the subject image formed on the image-forming surface and a CCD-type or MOS-type solid state imaging element is used. Imaging element 103 is driven by driver 115 that controls timing of extracting a signal. Diaphragm 102 is arranged between image-taking lens 101 and imaging element 103. Diaphragm 102 is driven by driver 114 that includes an aperture unit and its drive circuit for the aperture unit. An image signal from solid state imaging element 103 is input into analogue signal processing circuit 104 where correlation double sampling (CDS) and the like are processed. The image signal processed by analogue signal processing circuit 104 is converted into a digital signal from an analogue signal by A/D converter 135.

Various image processing such as an edge enhancement, a gamma correction, a white balance correction and so are performed on the A/D converted signal in digital signal processing circuit 106. Buffer memory 105 is a frame memory capable of storing data for a plurality of frames imaged by imaging element 103 and the A/D converted signal is temporarily stored on buffer memory 105. Digital signal processing circuit 106 reads the data stored on buffer memory 105 and implements each of the foregoing processing, and the post-processed data is stored again on buffer memory 105. CPU 112 is connected to digital signal processing circuit 106 and drivers 113 through 115, and controls a sequence when a camera is operated. AE computation section 1121 of CPU 112 computes an exposure based upon an image signal from the imaging element and AWB computation section 1122 thereof computes to determine a parameter for a white balance. Feature point-extraction-computation unit 1123 of CPU 112 extracts feature points like a shape, position, size etc. of a subject from image data in accordance with a predetermined algorithm, and stores a result of the extraction on storage section 1127 thereof. A user can select and register any feature point from the feature points stored thereon. Detection device 121 detects a position of the focus lens and a position of the zoom lens.

An AF system of a digital camera in this embodiment employs a well-known contrast method. Herein, an explanation about this contrast method will be given. There is a correlation between a degree of an out-of-focus of an image formed on imaging element 103 and its contrast, thereby getting a focus point by use of what an image contrast comes to a maximum when the image comes into focus. A size of the contrast can be evaluated by a size of a high frequency component of an image signal. Namely, AF computation section 1124 extracts a high frequency component of an image signal with a band pass filter (BPS) not shown herein and a value integrating this absolute value of the high frequency component is defined as a focus evaluation value, and an AF computation is implemented based upon the focus evaluation value. CPU 112 lets a focus lens position of image-taking lens 101 be adjusted and lets a focus action be taken by using a computation result of AF computation section 1124.

In operation member 116 connected to CPU 116, there are provided power switch 1161 that turns on and off a camera power, half-depressing switch 1162 and full-depressing switch 1163 that couple with a release button, setting button 1164 that selects and sets any of various menus displayed on monitor 109 at a time of a picture taking, and up/down (hereinafter referred to as U/D) button 1165 that updates a reproduction image and the like. With setting button 1164, in order to give extracted feature point a name, various characters like an alphabet, a Chinese character (kanji) and Japanese characters are also selected and set by using U/D button 1165. In addition, U/D button 1165 is also used to select a desired person from a plurality of extracted persons and drive the zoom lens manually toward a telephoto side or a wide-angle side when shooting.

When subject brightness is low, flash 117 is fired. This flash is provided with a pre-flash function that fires a supplementary flash beforehand prior to a shooting in order to prevent a pupil of a person from being photographed in red when firing a flash or lessen a so-called red eye phenomenon when so fired. This pre-flash function is used to measure subject brightness in advance at dim brightness. Other than information of the features as described before, information of a peak value of an evaluation value computed in AE computation section 1124 and information of a corresponding position of the focus lens and the like are stored on storage section 1125. The image data variously processed by digital signal processing circuit 106 is stored on external storage medium 111 like a memory card etc via record & reproduction signal processing circuit 110 after being temporarily stored on buffer memory 105. When image data is stored on storage medium 111, the data is usually compressed in predetermined form, for example, JPEG format. Record & reproduction signal processing circuit 110 implements a data compression for storing image data on external storage medium 111 and a decompression process of the compressed image data reproduced from external storage medium 111.

Monitor 109 is a liquid crystal display device (LCD) to display a photographed subject image and various setting menus when shooting or playing back. Herein, this monitor is also used to play back and display image data stored on external storage medium 111. When an image is displayed on monitor 109, image data stored on VRAM 107 that is a part of buffer memory 105 is extracted and digital image data is converted to an analogue picture image signal by D/A converter 108. Then, the image is displayed on monitor 109 by using this analogue picture image signal.

Herein, a relationship between buffer memory 105 and VRAM 107 when extracting features will be described. When image data for a motion image display is played back on monitor 109, data that is thinned out to the image data for the motion image display from image data for a still image is continuously output at a certain cycle (e.g. 30 f/sec.) from imaging element 103. Then, a predetermined process is performed on the image data, and data is further thinned out such that the number of pixels of the image data corresponds to the number of vertical and horizontal pixels of monitor 109 and then this thinned-out data is continuously stored on VRAM 107. The data stored on VRAM 107 is displayed as a motion image on monitor 109 through D/A converter 108. This image data of VRAM 107 is also used as data to extract a feature point. When a feature point is extracted, firstly, image data of VRAM 107 is stored again on buffer memory 105 at a predetermined timing. At this stage, only predetermined scope (e.g. a scope corresponding to 80% vertically and laterally of a display screen of, for instance, LCD monitor 109) at a center section of the image data stored on VRAM 107 is stored on buffer memory 105.

Like this, the reason why image data is stored on buffer memory 105 again from VRAM 107 is as follows. If a processing power of CPU 112 were high, a feature point could be extracted at a rate of 30 f/sec., but generally the processing power of CPU employed in digital cameras on the market is not so high. Therefore, storing of image data on buffer memory 105 again from VRAM 107 at a rate (e.g. 10 f/sec.) that matches a feature point-extraction-computation corresponding to the processing power of CPU 112 enables to extract the feature point. Even in this case, an image data for displaying is surely output from VRAM 107 at a normal rate, so a rate of updating a display of the monitor screen does not become late. Anyway, in AE and AF computations, the image data thinned-out at the rate of 10 f/sec. used for extracting a feature point that is stored on VRAM 107 as described above is not used, but image data thinned-out for the motion image display that is output from imaging element 103 at the rate of 30 f/sec. is used.

Generally, in a relatively affordable digital camera for women and elderly people, a digital camera that has a feature point-extraction function has not been marketed. Therefore, with such the feature point-extraction function, it becomes possible to provide a user with a shooting method based upon a new usage. In this case, it is desirable that a difference in user friendliness between a conventional digital camera and a camera of this invention be minimum as much as possible. Feature point-extraction-computation unit 1123 as described above is configured so as to work suitably responsive to an operation of a digital camera. In a first embodiment and a second embodiment herein, out of various shooting functions that a digital camera of this invention has, an extraction action when a zoom lens is operated will be described hereunder. In a third embodiment of this invention, an extraction action responsive to a selected AF mode will be described.

Figure 2:
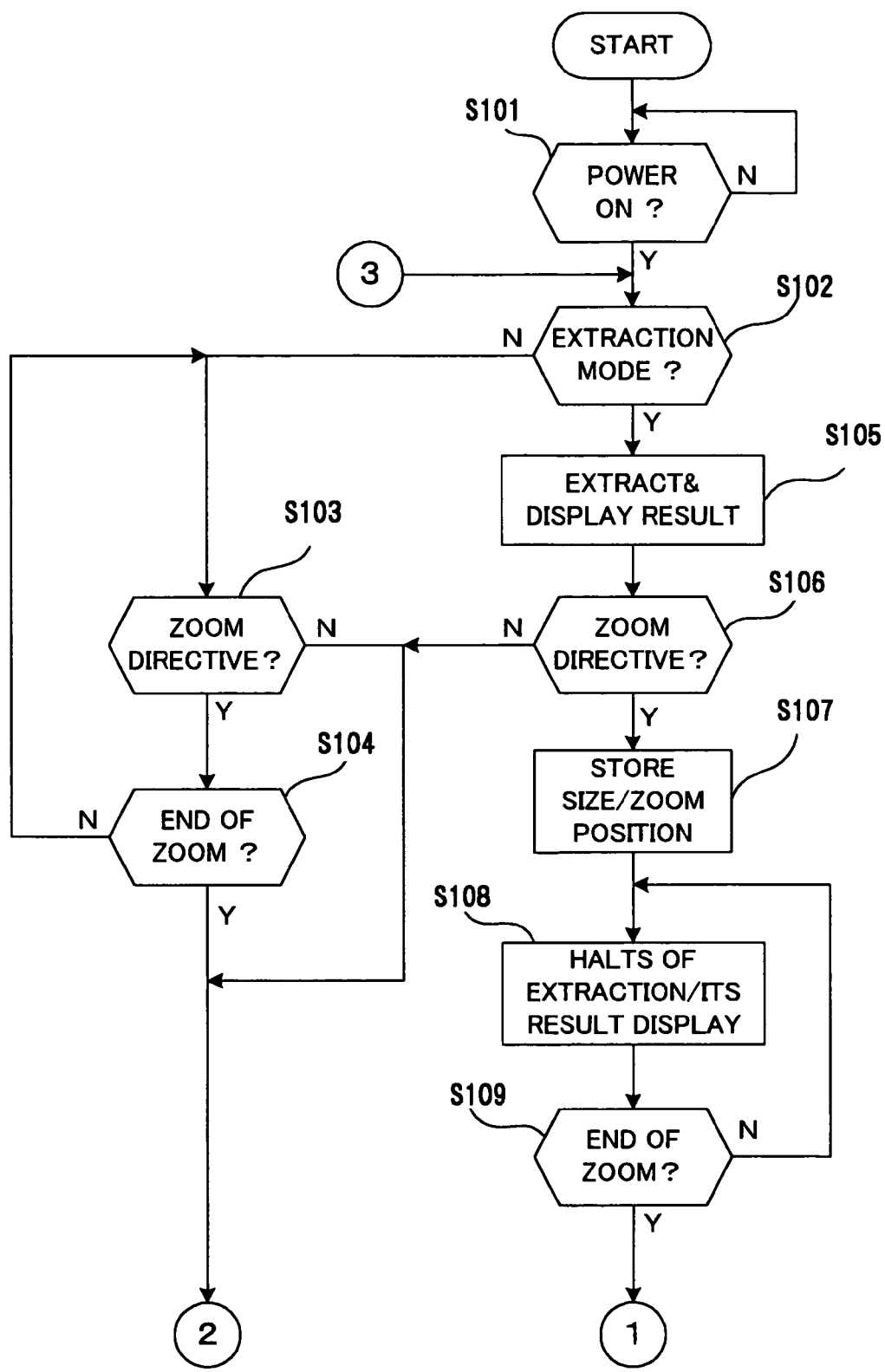
FIG. 2 is a flow chart describing an action sequence of the digital camera according to the present invention.
Figure 3:
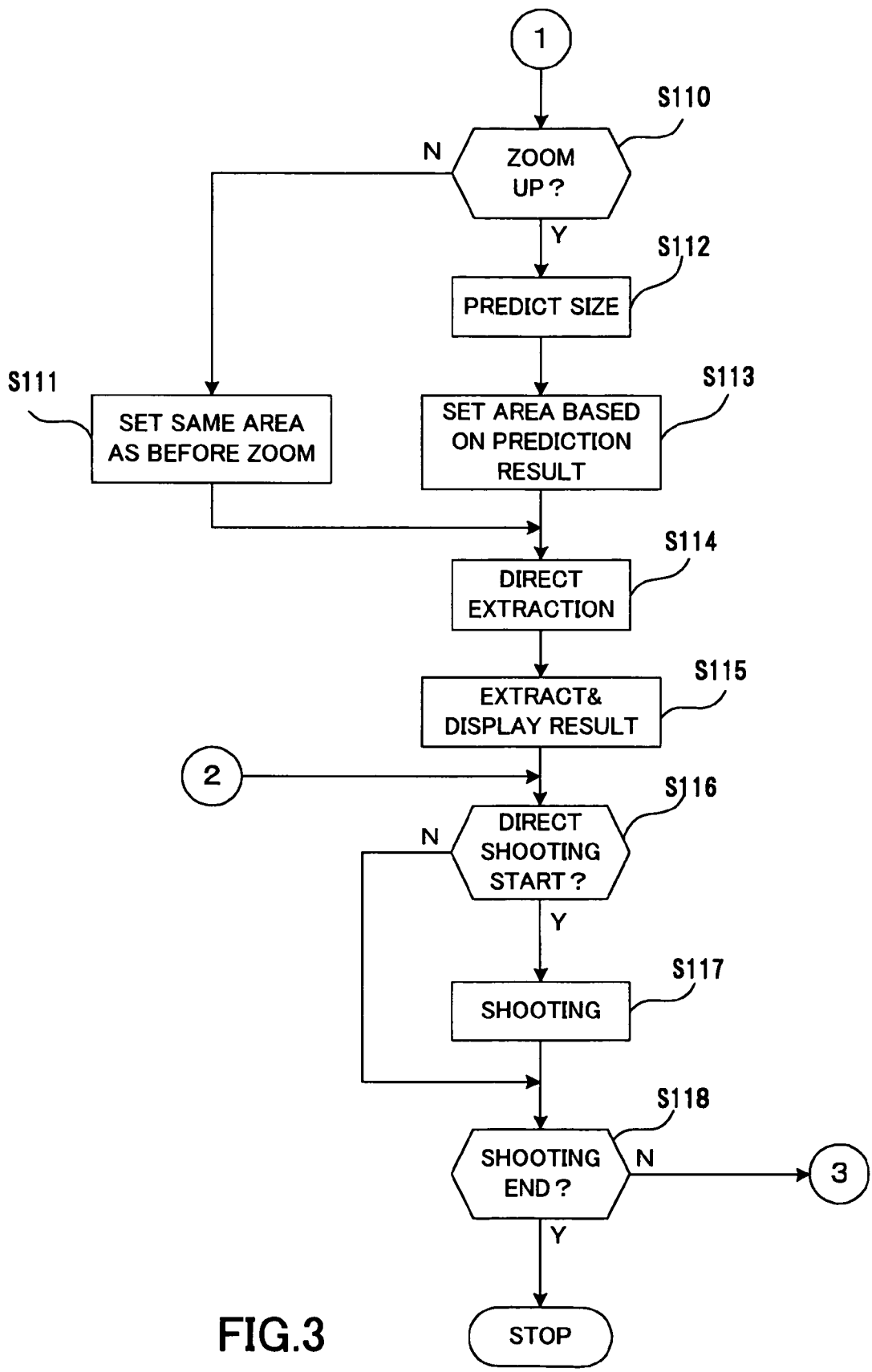
FIG. 3 is a flow chart describing an action sequence of the digital camera according to the present invention.

First, the first embodiment in a case where the zoom lens is operated will be described by referring to FIGS. 2 and 3. Usually, a size of a subject within a display screen is suddenly changed if the zoom lens is operated. As a result, even if a result of the feature point extraction is displayed, a display Position of the result is deviated from an actual display position of the subject, thereby causing a user to have an abnormal feeling. Thus, this embodiment avoids this by not operating an extraction or displaying the extraction result while the zoom lens is in action. FIGS. 2 and 3 show a sequence flow explaining that the extraction action is halted while the zoom lens is in action and also an area of extracting a feature point of a subject is set up by anticipating a size of the subject extracted at a time of starting the zoom operation simultaneously when the zoom operation is completed. This sequence enables to shorten a processing time required to extract the feature point when re-starting the extraction operation and quickly implement AF and AE operations that use the result.

When the digital camera is tuned on in step S101 of FIG. 2, in step S102, CPU 112 judges whether or not an extraction mode to display the extraction result on monitor 109 by extracting the feature point is set. As a method of setting this extraction mode, for one example, the extraction mode is selected from the shooting mode displayed by way of setting button 1164. When the mode is set to the extraction mode, a flow proceeds to step S105, or when the mode is not set to the extraction mode, a flow proceeds to step S103. In step S103, it is judged whether or not a zoom is directed. If the zoom is not directed, a flow proceeds to step S116 and if the zoom is directed, a flow proceeds to step S104. In step S104, it is judged whether or not the zoom directive is completed and if the zoom directive is not completed, a flow gets back to step S103 and a normal zoom action is repeated when the extraction mode is not set. When it is judged that the zoom directive is completed in step S104, a flow proceeds to step S116 of FIG. 3.

Figure 9:
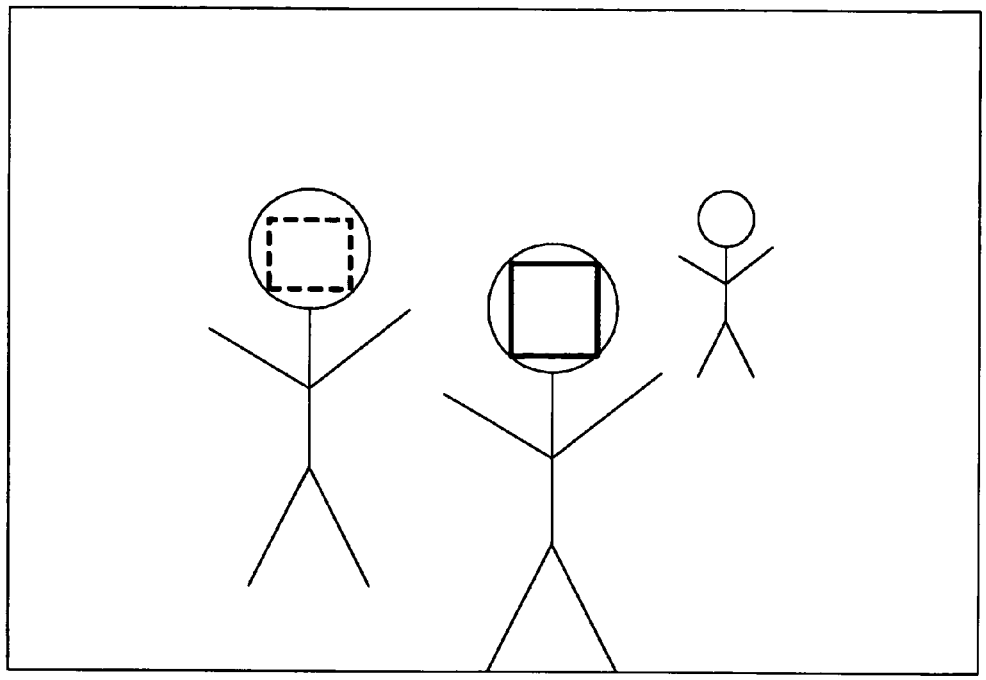
FIG. 9 is a display example in which an icon is displayed differentiating from each other with respect to the extracted feature portion.

When it is judged that the mode is set to the extraction mode in step S102, a flow proceeds to step S105 where feature point-extraction-computation unit 1123 extracts a feature point and the extracted feature point is superimposed on monitor 109 together with a taken image by way of an icon display. FIG. 9 Shows an example of this display. In FIG. 9, out of three persons within a display screen, one person cannot be extracted due to a long distance, but the icon display with a broken or solid line indicative of the extraction is superimposed on each of faces of two persons on a left side. The solid-lined icon display indicates that the person superimposed with the solid line is being selected as a principal subject. This principal subject can be changed by using U/D button 1165 after selecting a menu for changing the principal subject displayed on monitor 109 (not shown herein). In step S106, it is judged whether or not the zoom is directed by a user. This zoom directive is implemented by way of a telephoto or wide operation using U/D button 1165 of operation member 116. Herein, if U/D button 1165 is a cross-type key having four contacts of up/down and left/right, the left/right contacts can be set for the telephoto/wide operations of the zoom lens and the up/down contacts can be set for the principal subject selection displayed on monitor 109. With this arrangement, operations of the zoom and the principal subject selection would be made easier.

When the zoom is not directed, a flow proceeds to step S116 of FIG. 3 and when it is judged that the zoom is directed, a flow proceeds to step S107. In step S107, a size of the feature point corresponding to the principal subject extracted prior to the zoom directive and its position, and a position of the zoom lens prior to a lens movement detected by detection device 121 are stored on storage section 1125. In step S108, feature-extraction-computation unit 1123 is directed to halt the extraction action and also not to display the icon on monitor 109 as shown in FIG. 9. In step S109, it is judged whether or not the zoom operation is completed and when the zoom operation is not completed, a flow gets back to step S108 and a flow proceeds to step S110 when the zoom operation is completed.

In step S110, it is judged whether or not a current lens operation is zoomed up. When the lens operation is not a zoom up, a flow proceeds to step S111 and when the lens operation is the zoom up, a flow proceeds to step S112. In step S111, a same area for an extraction as in the pre-zoom operation is set up. In a case where the subject does not move and also a photographer does not move a digital camera, a position of a post zoomed-down lens can be predicted from information of a position before zooming down the lens. But, there are many cases where the photographer moves a shooting direction as well at the same time when the lens is zoomed down, so that the position where the lens was zoomed down cannot be predicted from the information since a position of the subject after zooming the lens down is unknown. In step S112, a size of the subject after zooming up the lens is predicted. One example of a prediction method will be described hereunder. Focal length f1 based upon a zoom lens position at a time of starting the zoom action detected by detection device 121 and stored on storage section 1125 is retrieved, and focal length f2 based upon a zoom lens position detected by detection device 121 at a time of completing the zoom action is read. With these focal lengths and the size (e.g. let H1 be a height of the subject) of the subject shortly before starting the zoom operation stored on storage section 1125, a predicted size (e.g. let H2 be a predicted height of the subject) of the subject at the time of completing the zoom operation becomes $$H2=(f2/f1)\times H1$$

In step S113, based upon this computation result, in order to extract the subject, an extraction area size and an extraction position are setup. Regarding the extraction area of this case, a large area on the order of 50% vertically and laterally against the predicted size of the subject obtained by the foregoing computation is set at a center portion of a display screen. Similarly in the case of zooming down the lens, when the subject does not move and the photographer does not move the digital camera, it is possible to predict a position of a post zoomed-up lens from the information of the position shortly before starting the zoom operation. In this case, there are many cases where the photographer moves the shooting direction as well at the same time when the lens is zoomed up. However, unlike the case of zooming down the lens, there are many cases where the principal subject is drawn right into a center portion of a display screen. Thus, a time required to extract the feature can be shortened by setting only an area in the neighborhood of the center portion of the display screen as the extraction area. At this moment, if the feature of the principal subject is not extracted, an extraction area set as a default may be set up immediately when the feature extraction is started.

In step S114, a feature point is extracted with regard to each of the set extraction area and in step S115, a result of the extraction is superimposed on the subject image. In step S116, it is judged whether or not a shooting start is directed by fully depressing full-depress SW 1163 after halfway depressing halfway-depress SW 1162. When the start is not directed, a flow proceeds to step S118 and when the start is directed, a subject is shot in step S117 and a flow proceeds to step S118. In step S118, it is judged whether or not the shooting is ended. The end of the shooting device that camera power SW1161 is turned off or a playback mode and so are set. When the shooting is ended, this flow sequence is ended and when the shooting is not ended, a flow gets back to step S102. In step S108, the extraction action is not halted, but only the icon may not be displayed. In such the case, a time for an extraction computation is added herein and so, if processing like AE, AF and the like is performed at a time of zooming, respective processing cycle is prolonged. But, sequence of various image processing at the time of zooming can be made equal as at the time of not zooming, so the sequence at the time of zooming does not become complicated.

Figure 4:
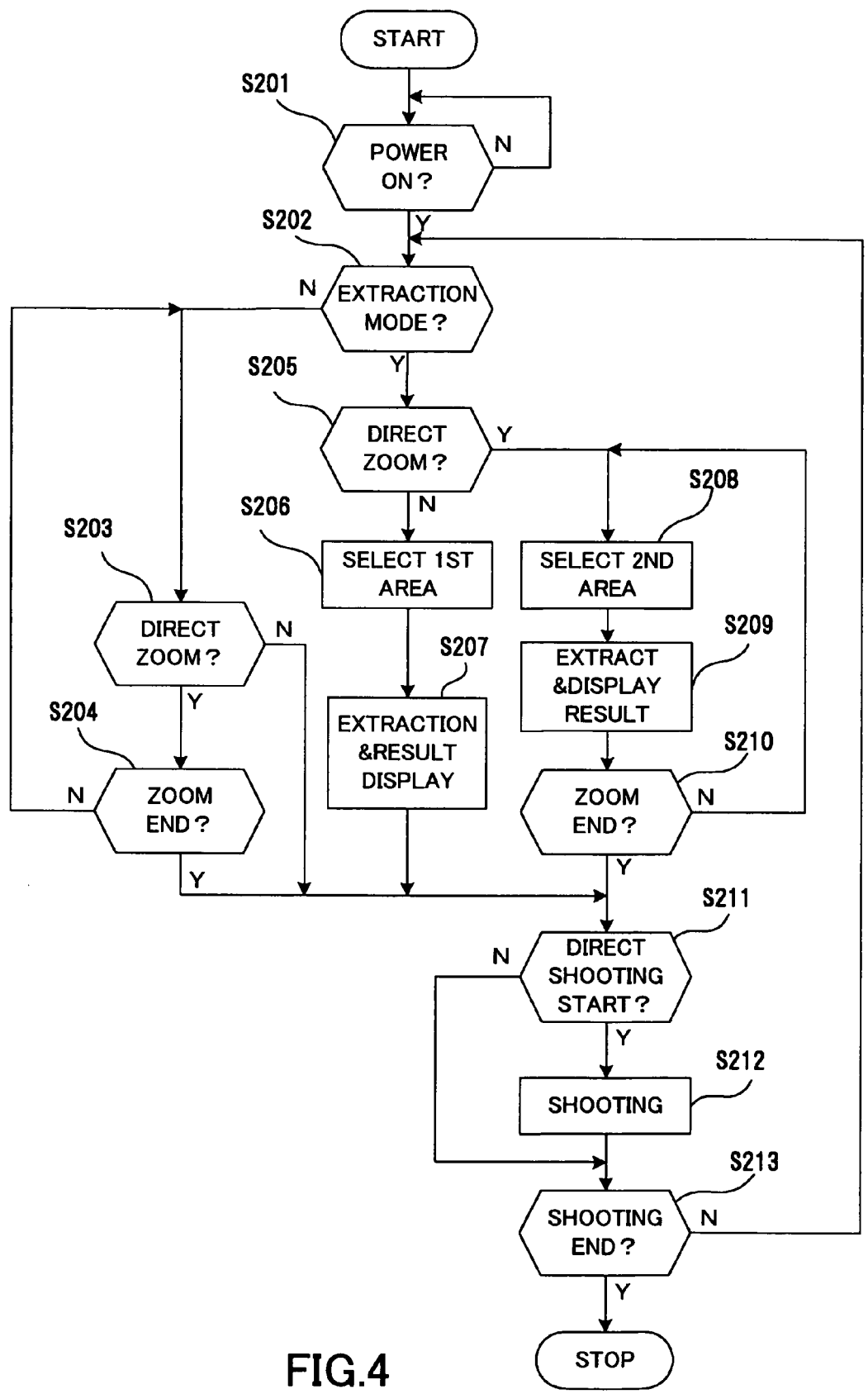
FIG. 4 is a flow chart describing other action sequence of the digital camera according to the present invention.

In FIGS. 2 and 3, the case where the feature point is not extracted or the extracted feature point is not displayed has been described so far. Next, as a second embodiment, a method in which the feature point is extracted more quickly by not halting the extraction even during the zoom in action and by narrowing the extraction area will be described in reference to FIG. 4. In step S201, when the digital camera is turned on, it is judged in step S202 whether or not the camera is set to the feature point extraction mode. When the feature point extraction mode is not set, a flow proceeds to step S203 and a flow proceeds to step S205 when the feature point extraction is set. In step S203, it is judged whether or not the zoom is directed. When the zoom is not directed, a flow proceeds to step S211 and when the zoom is directed, a flow proceeds to step S204. In step S204, it is judged whether or not the zoom directive is ended and when the zoom directive is not ended, a flow gets back to step S203 where the normal zoom action for a case where the extraction mode is not set is repeated. When it is judged in step S204 that the zoom directive is ended, a flow proceeds to step S211.

Figure 10:
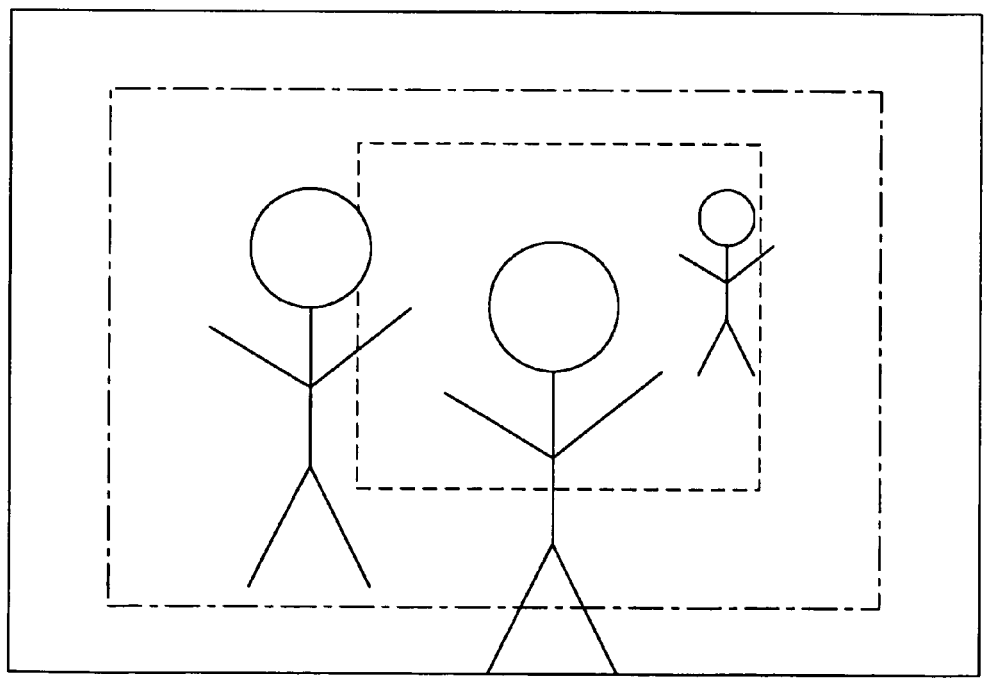
FIG. 10 is a view describing an extraction area within the image-taking screen.

When the extraction mode is set in step S202, it is judged in step S205 whether or not the zoom is directed. When it is judged that the zoom is not directed, a flow proceeds to step S206 where an area of vertical and horizontal 80% respectively of an area set as a default for extracting the feature point within a picture screen is selected and in step S207, a feature point of a subject is extracted from this area and is displayed on LCD monitor 109 with at least any of the feature point or an icon corresponding to the feature point superimposed on the subject image. Herein, this area is referred to as a first area. In step S205, when it is judged that the zoom is directed, a flow proceeds to step S208 where an extraction area of a predetermined scope centering on the principal subject extracted before directing the zoom is selected and in step S209, a feature point of the subject is extracted from this area and is displayed on LCD monitor 109 with at least any of the feature point or an icon corresponding to the feature point superimposed on the subject image. Herein, this area is referred to as a second area. FIG. 10 shows an example of displaying the first area and the second area on the display screen of LCD monitor 109. In FIG. 10, an area enclosed by a dashed line is the first area and the second area is enclosed by a broke line. As a size of the second area, a large area on the order of 50~100% vertically and laterally against a size of a detected feature is selected. These areas may not be displayed all the time. In step S210, it is judged whether or not the zoom directive is ended. When the zoom directive is not ended, a flow gets back to step S208 and when the zoom directive is ended, a flow proceeds to step S211.

In step S211, it is judged whether or not the shooting start is directed by depressing halfway-depress SW 1162 and full-depress SW 1163. When the shooting start is not directed, a flow proceeds to step S213 and when the shooting start is directed, a flow proceeds to step S212. In step S212, a subject is shot and a flow proceeds to step S213. In step S213, it is judged whether or not the shooting is ended and when the shooting is not ended, a flow gets back to step S202 and when the shooting is ended, this sequence is ended. Like this, by narrowing the extraction area, the time required for the extraction computation becomes shortened and even during the zoom, the extraction result can be displayed following the changes in the subject.

Figure 5:
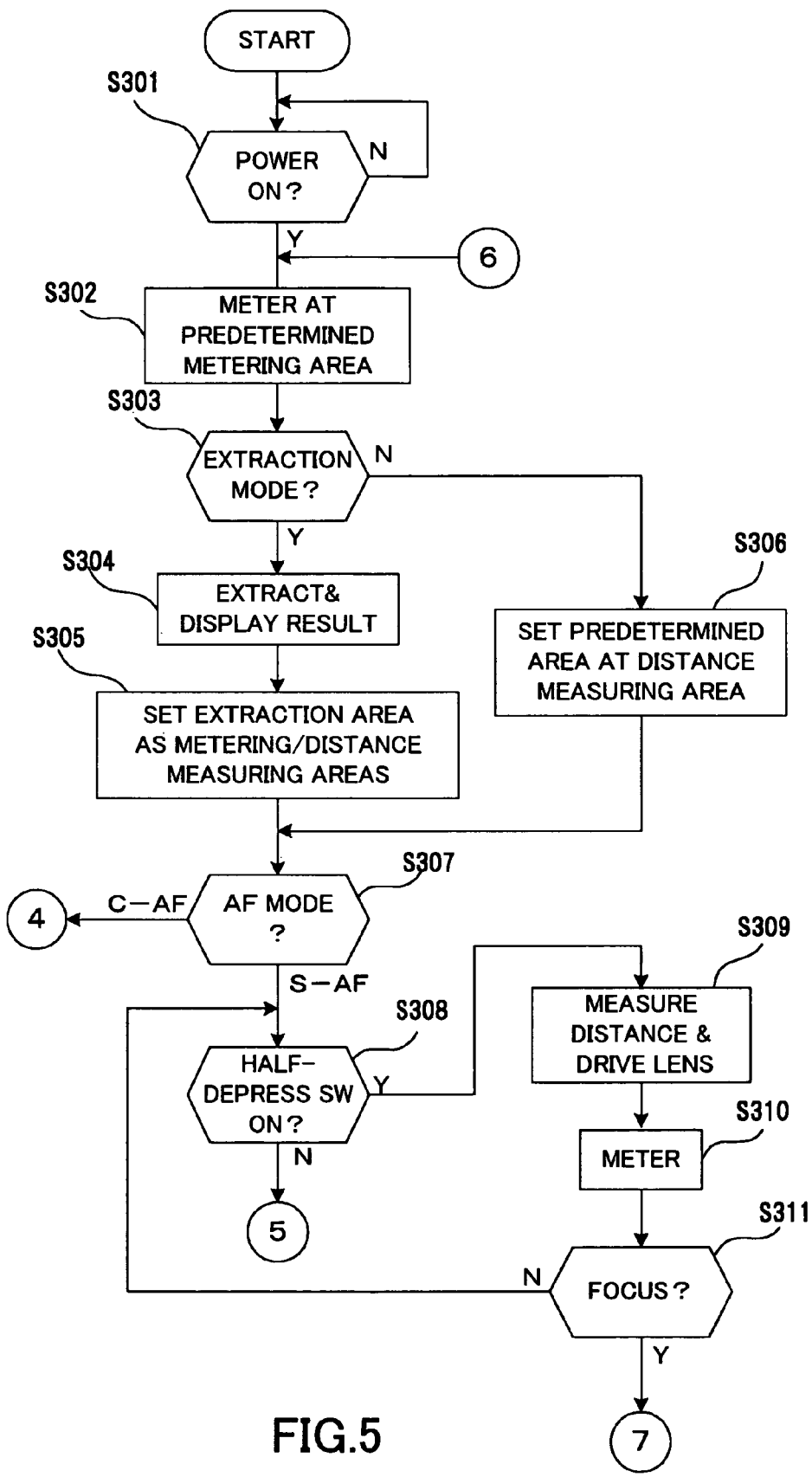
FIG. 5 is a flow chart describing other action sequence of the digital camera according to the present invention.
Figure 6:
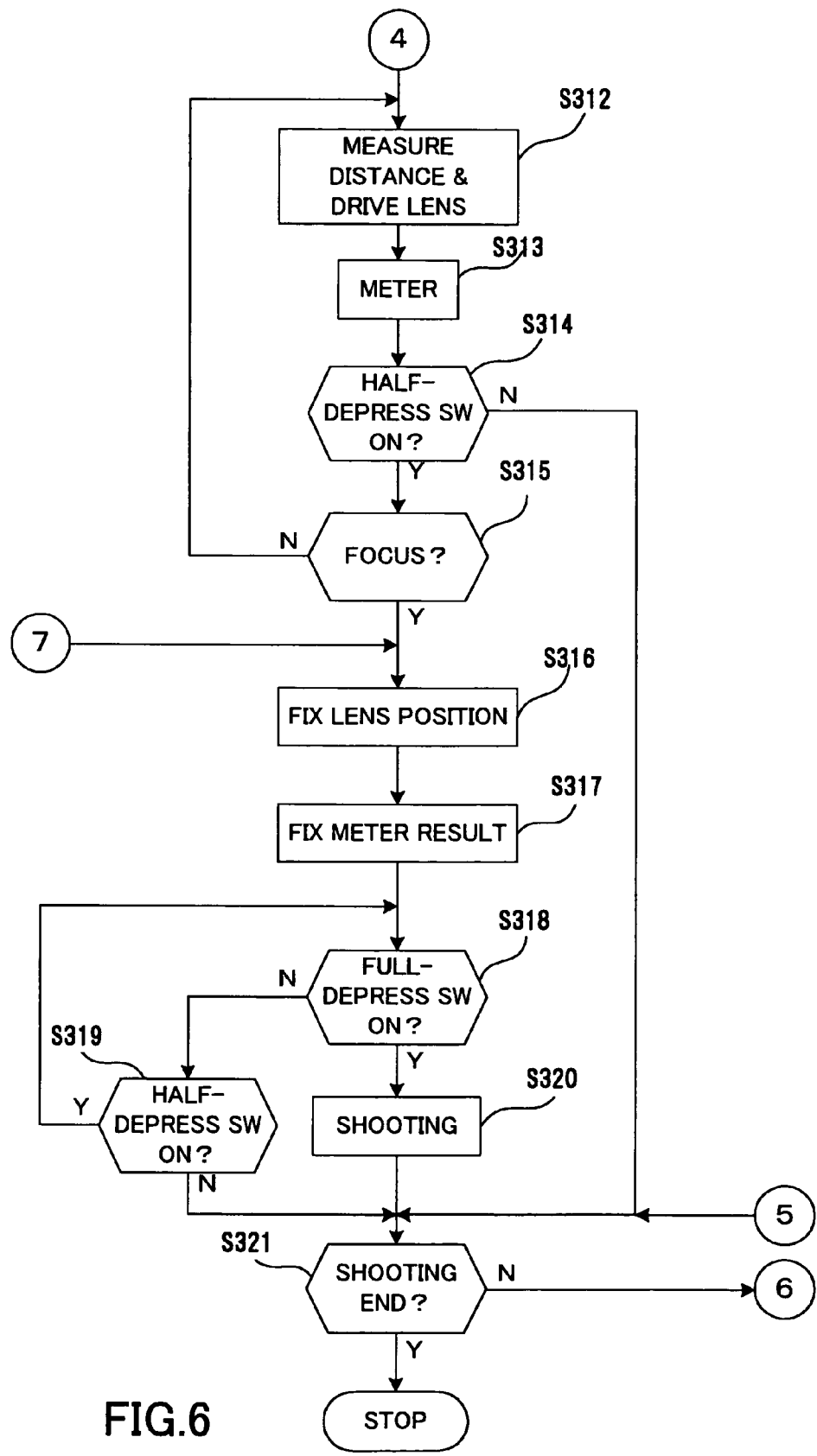
FIG. 6 is a flow chart describing other action sequence of the digital camera according to the present invention.

Next, as a third and fourth embodiments, a sequence to extract a feature point in a stage prior to a shooting will be described in reference to FIGS. 5 to 8. In these embodiments, the extraction action and the display form are set up such that they are not something wrong with user friendliness in the stage before the shooting in the conventional digital camera. FIGS. 5 and 6 to describe the third embodiment are mainly an action flow of the compact digital camera, not the SLR digital camera. The digital camera of this type usually has an exclusive optical finder (not shown) different from image-forming optical systems 101 and 102 as described in FIG. 1 and with this optical finder, the subject can be viewed, and moreover, the subject image formed on imaging element 103 via image-forming optical systems 101 and 102 can be viewed on LCD monitor 109.

When the power of the digital camera is turned on in step S301 of FIG. 5, a metering computation is performed in step S302. The metering computation herein uses a predetermined metering area corresponding to a metering method selected by a user. AE computation section 1221 measures a subject brightness using an output from this metering area. In step S303, it is judged whether or not the feature extraction mode is set. When the feature extraction mode is not set, a flow proceeds to step s306 and when the feature extraction mode is set, a flow proceeds to step S304. In step S304, a feature point is extracted from a predetermined extraction area, and the extraction result is displayed on LCD monitor 109 with the icon superimposed on the shot image. Herein the predetermined extraction area is, for example, the vertical and lateral 80% area of the entire area respectively within the display screen as described before. An example of displaying the icon of the extraction result is shown in FIG. 9. In step S305, the predetermined area including the principal subject indicated by a square with the bold solid line in FIG. 9 is set as the metering and distance measuring areas. The predetermined area in this case is, for example, a vertically and laterally large area respectively by 50% including the principal subject. Only any of the metering and distance measuring areas may be set up. In step S306, the AF area selected in advance by a user is set up.

In step S307, a status of the AF mode is judged. The AF mode has two AF modes of a single AF (hereinafter described as S-AF) and a continuous AF (hereinafter described as C-AF), so an explanation about the AF mode will be given first. In the S-AF mode, only while half-depress SW 1162 is halfway depressed, a cycle in which a focus evaluation value is computed in AF computation section 1124 and the focus lens is driven based upon the computation result is repeated, and when the lens is focused, the focus lens is fixed at this focus position (this is called "AF lock"). In the C-AF mode, the AF action is repeated regardless of in-focus or out-of-focus after the power of the digital camera is turned on or the AF mode is set to the C-AF mode and when half-depress SW 1162 is halfway depressed, the focus evaluation value right before depressing SW 1162 is compared with a computed focus evaluation value after depressing SW 1162. As a result, it is judged that a subject is in focus when a change in the focus evaluation value comes within a predetermined range and then the focus lens is fixed at a position where the focus lens lies right before depressing SW 1162, and when the change exceeds the predetermined range, after the lens reaches an in-focus position by moving the lens, its focus lens position will be fixed (AF lock). This AF mode setting is implemented by selecting a menu displayed on LCD monitor 109 using setting button 1164 and U/D button 1165 similarly in the extraction mode setting (not shown).

In step S307, when it is judged that the S-AF mode is set, a flow proceeds to step S308 where it is judged whether or not half-depress SW 1162 is depressed. When SW 1162 is not depressed, a flow proceeds to step S321 of FIG. 6 and when it is depressed, a flow proceeds to step S309. In step S309, the distance is measured using an output from the distance measuring area set up in step S305 or S306, and based upon the measurement result, the lens is driven. In this embodiment, as described before, the focus evaluation value is computed and the focus lens is driven based upon the computation result. In step S310, the subject brightness is measured using an output from the metering area in the same way as in the distance measurement. In step S311, it is judged whether or not the lens is focused. As a method of this judgment, for example, when the focus evaluation value is more than the predetermined value and a difference between the previously computed focus evaluation value and the latest focus evaluation value comes within the predetermined value, it is judged that the lens is focused. When it is not judged in step S311 that the lens is focused, a flow gets back to step S308 where the focus action is repeated until the lens is focused as long as half-depress SW 1162 is depressed. At this moment, a metering action is repeated, too. In step S311, when it is judged that the lens is focused, a flow proceeds to step S316 of FIG. 6.

In step S307, when it is judged that the AF mode is set to the C-AF mode, a flow proceeds to step S312 of FIG. 6 where the distance is measured and the focus lens is driven and then proceeds to step S313 where the metering is computed. In step S314, it is judged whether or not half-depress SW 1162 is depressed and when it is judged that half-depress SW 1162 is not depressed, a flow proceeds to step S321. In this step S321, it is judged whether or not the shooting is ended and when the shooting is not ended, the feature point extraction (step S304), the distance measurement and the lens drive (step S312), and the metering. (step S313) are repeated as long as half-depress SW 1162 is not depressed. When it is judged in step S314 that half-depress SW 1162 is depressed, a flow proceeds to step S315 where it is judged whether or not the focus lens is focused. When it is judged that the focus lens is not focused, a flow gets back to step S312 where the focus action is repeated. When it is judged that the focus lens is focused, a flow proceeds to step S316.

In step S316, the focus lens is fixed at the focus position (AF lock) and in step S317, the metering result at a time of focusing the lens is fixed (this called "AE lock". In step S318, it is judged whether or not full-depress SW 1163 is depressed. When the full depress SW 1163 is not depressed, a flow proceeds to step S319 where it is further judged whether or not half-depress SW 1162 is depressed. When half-depress SW 1162 is kept depressed, a flow gets back to step S318 and when half-depress SW 1162 is not depressed, a flow proceeds to step S321. In step S318, when full-depress SW 1163 is depressed, a flow proceeds to step S320 where the subject is shot, and then proceeds to step S321. Instep S321, it is judged whether or not the shooting is ended. The end of the shooting device a case where the power of the digital camera is turned off or an action mode of the digital camera is changed from the shooting mode for shooting the subject to the playback mode for playing back image data stored on memory card 111 on monitor 109 and the like. When the shooting is not ended, a flow gets back to step S302 of FIG. 5, the extraction, the metering, and the distance measuring corresponding to the set AF mode and/or extraction mode are repeated.

Figure 11:
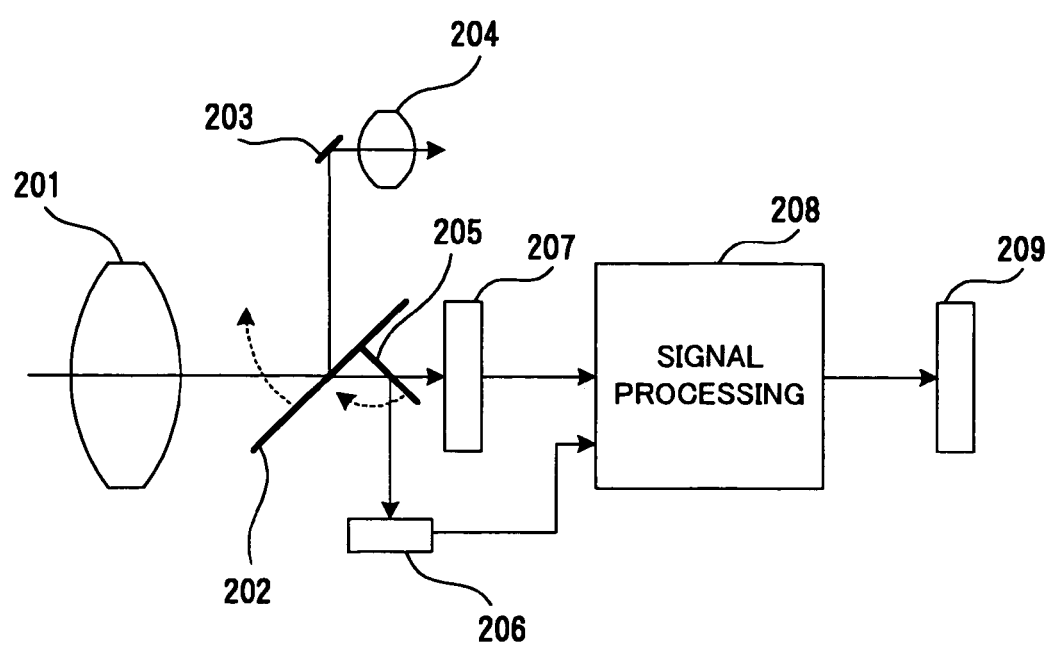
FIG. 11 is a view describing other general configuration of the digital camera according to the present invention.

Next, as the fourth embodiment, the feature point extraction mainly in the SLR digital camera will be described. The digital camera of this type introduces a flux of light passed through the image-taking lens into an optical finder by changing a direction thereof with a quick return-type reflex mirror right in front of the imaging element. Thus, the flux of light from the subject toward the imaging element, which outputs image data for recording, is cut off before shooting. Usually the imaging element for viewing the shot image on the monitor screen is not provided, so the shot image cannot be displayed on LCD monitor before shooting. FIG. 11 is a schematic block view to explain mainly a structure around the reflex mirror of this SLR digital camera. Herein, operation member, various signal processing circuits and the like are of the same structure as in FIG. 1, so a view is omitted.

In FIG. 11, reference numeral 201 is the image-forming optical system and is made up of the image-taking lens, a diagram and so similarly in FIG. 1. Reference numeral 202 is the quick return-type reflex mirror and due to this reflex mirror, a majority of the flux of light from the subject is reflected upward at an angle of 90 degrees. This reflected light is re-directed by total reflection sub-mirror 203, and proceeds to finder optical system 204. The neighborhood of a center of reflex mirror 202 is a half mirror (approx. vertically and laterally 80% respectively of the entire screen) and the flux of light transmitted through the half mirror is reflected by a second total reflex sub-mirror, and the flux of light is formed on sub-imaging element 206 that outputs data for the AE and AF computations. Imaging element 207 is a main imaging element that forms a subject image for recording and an output from this imaging element is processed digitally and in an analog way with signal processing circuit 208, and the processed output is stored on the memory card. LCD monitor 209 plays back shot image data stored on a buffer memory (not shown) in signal processing circuit 208 or on a memory card (not shown). The foregoing output from the sub-imaging element is input into signal processing circuit 208, and the AF and AE computations, and the feature point extraction are implemented by use of this output signal. The AF and AE computations may use a different exclusive sensor respectively rather than sub-imaging element 206. Quick return-type reflex mirror 202 and sub mirror 205 move as indicated respectively with the broken line when shooting a scene for recording, and the total flux of light from the subject is input into main imaging element 207.

Figure 7:
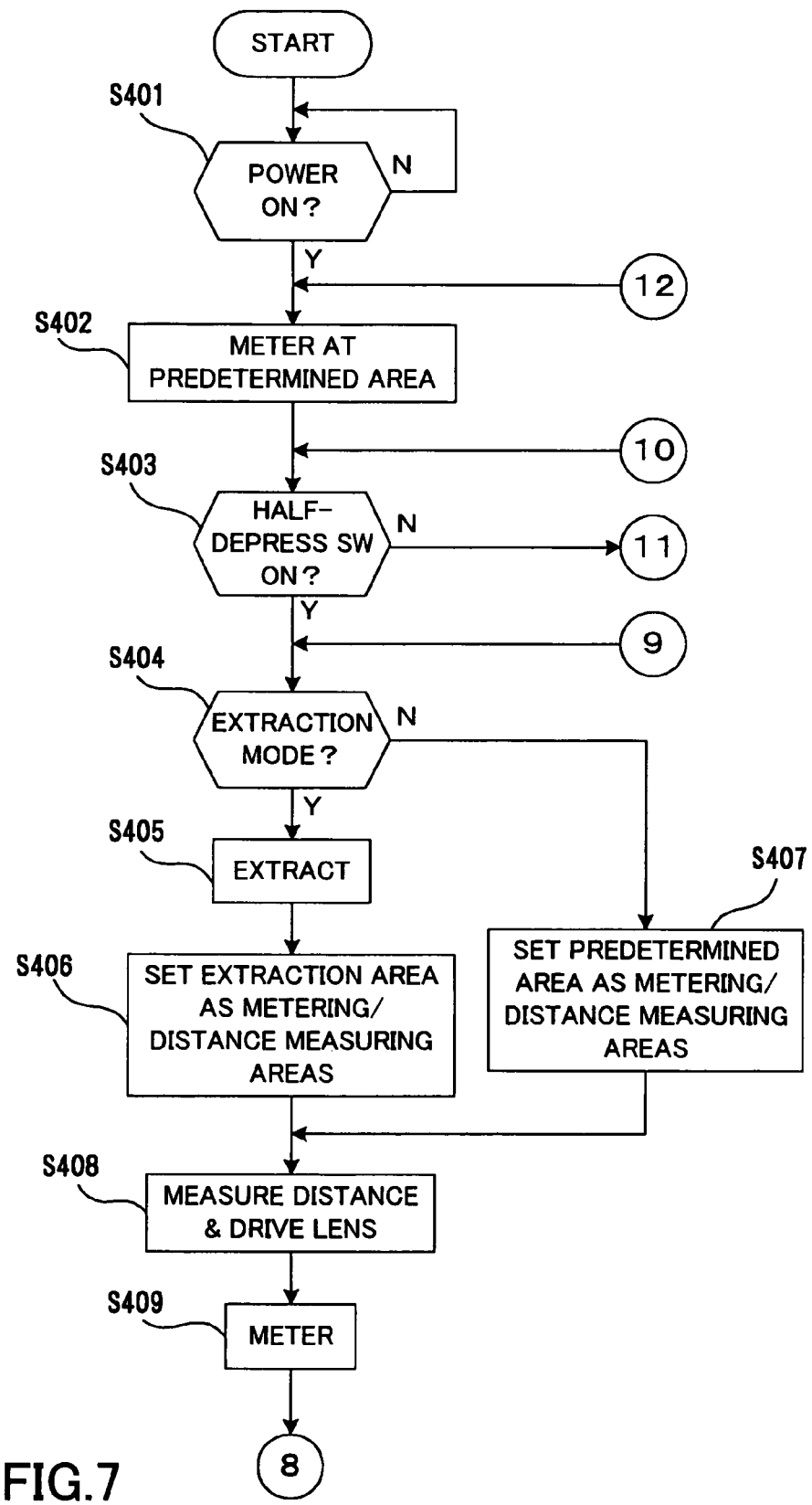
FIG. 7 is a flow chart describing other action sequence of the digital camera according to the present invention.
Figure 8:
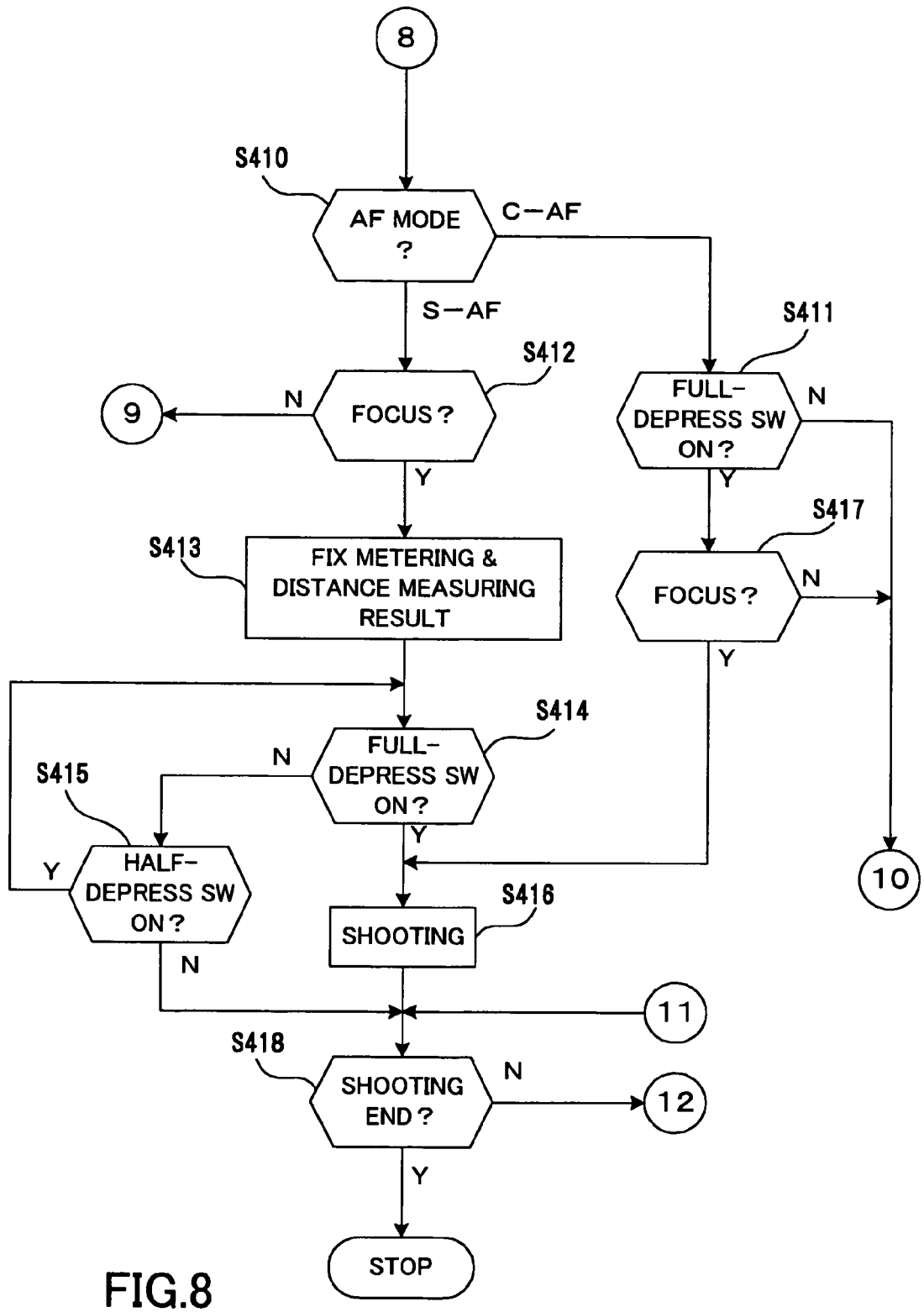
FIG. 8 is a flowchart describing other action sequence of the digital camera according to the present invention.

Referring to FIGS. 7 and 8, an action flow of the SLR digital camera will be described. When the power of the digital camera is turned on in step S401 of FIG. 7, the metering is computed in step S402. The metering computation herein is the same as in step S302. In step S403, it is judged whether or not half-depress SW 1162 is turned on. When SW 1162 is not turned on, a flow proceeds to step S417 of FIG. 8 where the metering is repeated as long as the shooting is not ended. When SW 1162 is turned on, a flow proceeds to step S404 where it is judged whether or not the feature extraction mode is set. When the feature extraction mode is not set, a flow proceeds to step S407 where the distance measuring area is set to the predetermined distance measuring area set beforehand. When the extraction mode is set in step S404, a flow proceeds to step S405 where the feature point is extracted. In step S406, a predetermined area including a subject to be extracted is set as the metering and distance measuring areas. Herein similarly in step S305, for example, a vertically and laterally large area respectively by 50% is set respectively as the metering and distance measuring areas.

In step S408, a distance to the subject is measured using the set distance measuring area, and the focus lens is driven based upon the distance measurement result. Like this, in the case of the single lens reflex type digital camera, the extraction of the subject and the distance measuring are started only after half-depress SW 1162 is depressed. However, if the extraction is started after the half depression and the distance is measured based upon the extraction result, it would take much time to get a focus. Thus, the extraction of the subject may be implemented prior to the metering in step S402. If the extraction of the subject is implemented as above, an area to be extracted in following step S402 can be set as the metering area and then, the distance measurement can be started shortly after the half depression.

In step S409, the metering is computed using the set metering area. In step S410 of FIG. 8, a status of the AF mode measuring the distance of the subject is judged. Even in the AF mode of the SLR digital camera, there are the S-AF and C-AF modes. In the case of the S-AF mode, a flow proceeds to step S412 where it is judged whether or not the image-taking lens is focused. When the image-taking lens is not focused, a flow gets back to step S404 of FIG. 7 and when the image-taking lens is focused, a flow proceeds to step S413. In step S413, the image-taking lens is fixed at the focus position (AF lock) and also the metering result is fixed (AE lock). In step S414, it is judged whether or not full-depress SW 1163 is depressed. When SW 1163 is not depressed, a flow proceeds to step S415 where it is judged whether or not half-depress SW 1162 is depressed and when. SW 1162 is also depressed, a flow gets back to step S414. When half-depress SW 1162 is not depressed in step S415, a flow proceeds to step S418. When full-depress SW 1163 is depressed in step S414, a flow proceeds to step S416 where a subject is shot.

When the AF mode is set to the C-AF mode in step S410, a flow proceeds to step S411 where it is judged whether or not full-depress SW 1163 is depressed. When SW 1163 is not depressed, a flows gets back to step S403 of FIG. 7 and when SW 1163 is depressed, a flow proceeds to step S417. In step S417, it is judged whether or not the image-taking lens is focused. When the image-taking lens is not focused, a flow gets back to step S403 of FIG. 7 and when the image-taking lens is focused, a flow proceeds to step S416 where a subject is shot. Like this, in the case of the SLR digital camera, the AF action is continuously kept on regardless of in-focus or out-of-focus as long as half-depress SW 1162 is depressed in the C-AF mode. Usually, in the conventional SLR digital camera, there are many cases where a shutter releasing has priority over focusing and in these cases, step S417 described in the sequence flow is omitted. Namely, the shooting is started shortly after full-depress SW 1163 is depressed regardless of the in-focus or the out-of-focus. In step S418, it is judged whether or not the shooting is ended and when the shooting is not ended, a flow gets back to step S402 and when the shooting is ended, this flow is ended.

Next, cases where CPU 112 directs feature point-extraction-computation unit 1123 to halt the extraction action corresponding to the shooting mode of the digital camera in a fifth and sixth embodiments and changes an extraction method in a seventh and eighth embodiments will be described. In these embodiments, processing (processing such as AF, AE and the like and a camera sequence) rather than the extraction action is common. The shooting mode herein refers to a mode set for the digital camera to shoot continuously. This continuous shooting mode corresponds to two kinds of the continuous shooting modes, a continuous shooting mode where a still image of a subject is continuously shot at high speed or a motion-image shooting mode where a motion image of a subject is shot. In the case of the continuous shooting mode, still image data of approximately entire pixels (the dominating number of pixels currently in the imaging element is on the order of 1 million~5 million pixels) in imaging element 103 output at a speed of 5~10 frames per second is stored on external storage medium 111. In the case of the motion-image shooting mode, image data that is thinned out to resolution equal to VGA (on order of 300K pixels) from imaging element 103 is output at a speed of 60 frames per second or 30 frames per second, and is stored on external storage medium 111. If a digital camera has a plurality of high-speed processors, it is possible to implement the feature extraction action in parallel with the storage action even during such the continuous storage action. However, in most of the digital cameras, only a minimum quantity of processors whose processing capability is not so high are loaded from a view point of an electric power consumption and a loading space. When using these processors, the storage processing and the feature extraction processing are forced to be performed in series, so that it becomes impossible to ensure the number of storing frames per second as described above. Thus, according to this embodiment, when the mode is set to the continuous shooting mode, the storage action is implemented by changing or halting the extraction processing unlike the usual still-image shooting for each frame. With this implementation, it becomes possible to ensure the same storage speed or a speed close to it as at the time of the usual continuous shooting.

Figure 12:
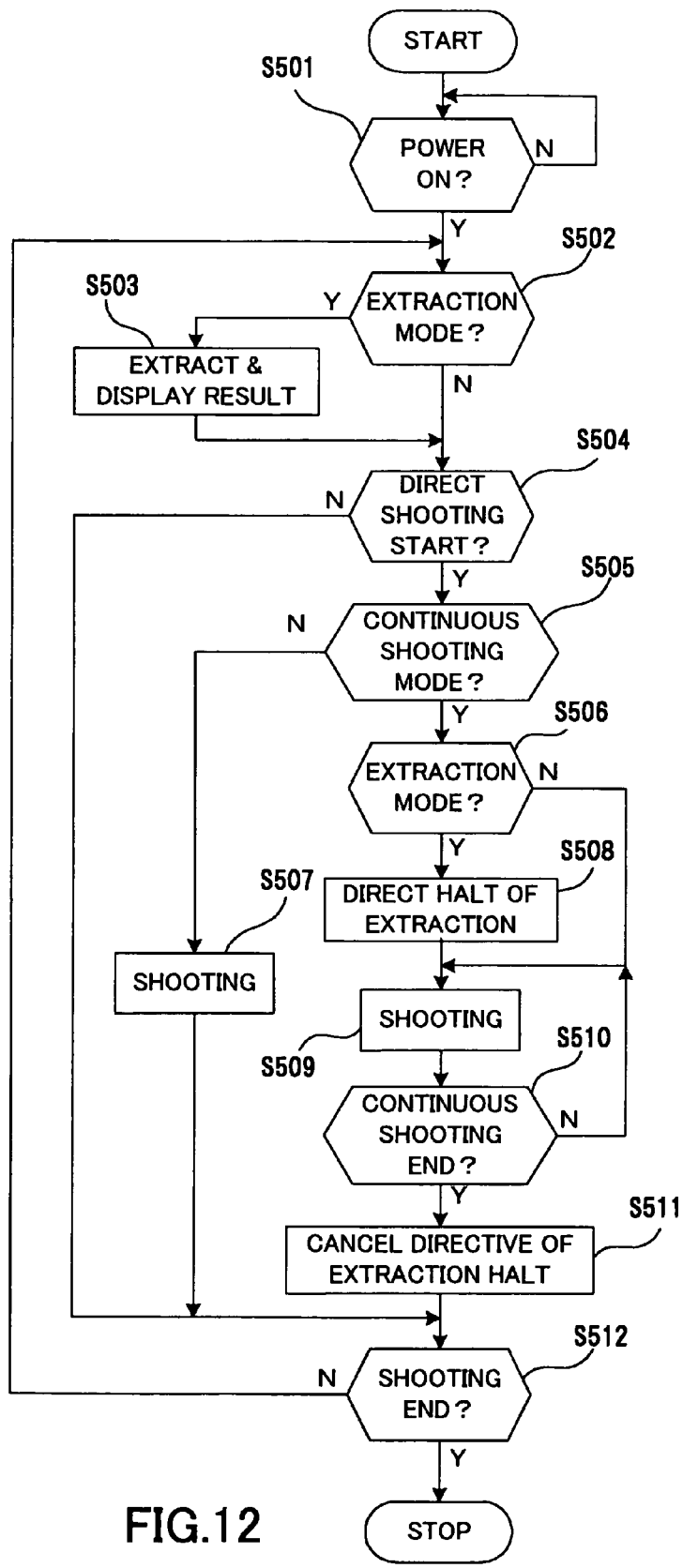
FIG. 12 is a flow chart describing an action sequence of the digital camera according to the present invention.

An explanation about the fifth and sixth embodiments where the extraction processing is halted when the continuous shooting mode is set will be given using FIGS. 12 and 13. FIG. 12 explaining the fifth embodiment is a flow where the extraction processing is halted when the continuous shooting is actually implemented by depressing full-depress SW 1163. When a power-on of the digital camera is detected in step S501, it is judged in step S502 whether or not an extraction mode to extract the feature is set. As one example of methods of setting this extraction mode, the extraction mode is selected from the shooting mode displayed on LCD monitor 109 by operating setting button 1164, and is so set. When it is judged in step S502 that the extraction mode is set, a flow proceeds to step S503 where a feature point of the subject is extracted from an output of the imaging element at a predetermined timing and the extracted feature point is displayed on LCD monitor 109 by superimposing the extracted feature point on a "through" image (or a motion image output from the imaging element just for viewing purposes, not storing), and in step S504, a directive to start the shooting is waited for. When it is judged in step S502 that the extraction mode is not set, a flow proceeds to step S504. In step S504, it is judged whether or not full-depress SW 1163 is depressed and the start of shooting the subject is directed. When the start of shooting the subject is not directed, a flow proceeds to step S512 and when the start of shooting the subject is directed, a flow proceeds to step S505. In step S505, it is judged whether or not the continuous shooting mode is set. A setting of the continuous shooting mode herein is implemented by using setting button 1164. When the continuous shooting mode is not set in step S505, a flow proceeds to step S507 where the usual one frame shooting is implemented and then proceeds to step S512. When the continuous shooting mode is set, a flow proceeds to step S506 where it is judged again whether or not the extraction mode is set. When the extraction mode is not set, a flow proceeds to step S509 and when the extraction mode is set, a flow proceeds to step S508. In step S508, a halt of extraction processing is directed. In step S509, a shooting of the number of pixels corresponding to the continuous shooting is implemented and in step S509, it is judged whether or not the continuous shooting is ended. The end of the continuous shooting is judged by whether or not depression of full-depress SW1163 is released. When SW 1163 is kept on depressed, a flow gets back to step S509 where the continuous shooting of the still image or the motion image is implemented.

In step S510, when it is judged that the continuous shooting is ended, a flow proceeds to step S511 where the directive to halt the extraction is cleared. In step S512, it is judged whether the mode is set to an action mode (playback mode and the like) rather than the shooting mode or the shooting is ended by turning power SW 1161 off. When the shooting is not ended, a flow gets back to step S502 and when the shooting is ended, this flow is ended.

In a case of FIG. 12, the extraction processing is configured to be halted only when full-depress SW 1163 is depressed and then the continuous shooting action is actually implemented. At the time of shooting continuously, in many instances, photographers are going to shoot after making sure that the principal subject is positioned at or around a center of a picture screen and there are many cases where it is not necessary to take the trouble to extract the principal subject. In these cases, the extraction action may be halted during an entire period of time that the action mode of the digital camera is being set to the continuous shooting mode. A flow of this case is shown in FIG. 13 explaining the sixth embodiment. Setting button 1164 sets any of FIG. 12 or FIG. 13.

Figure 13:
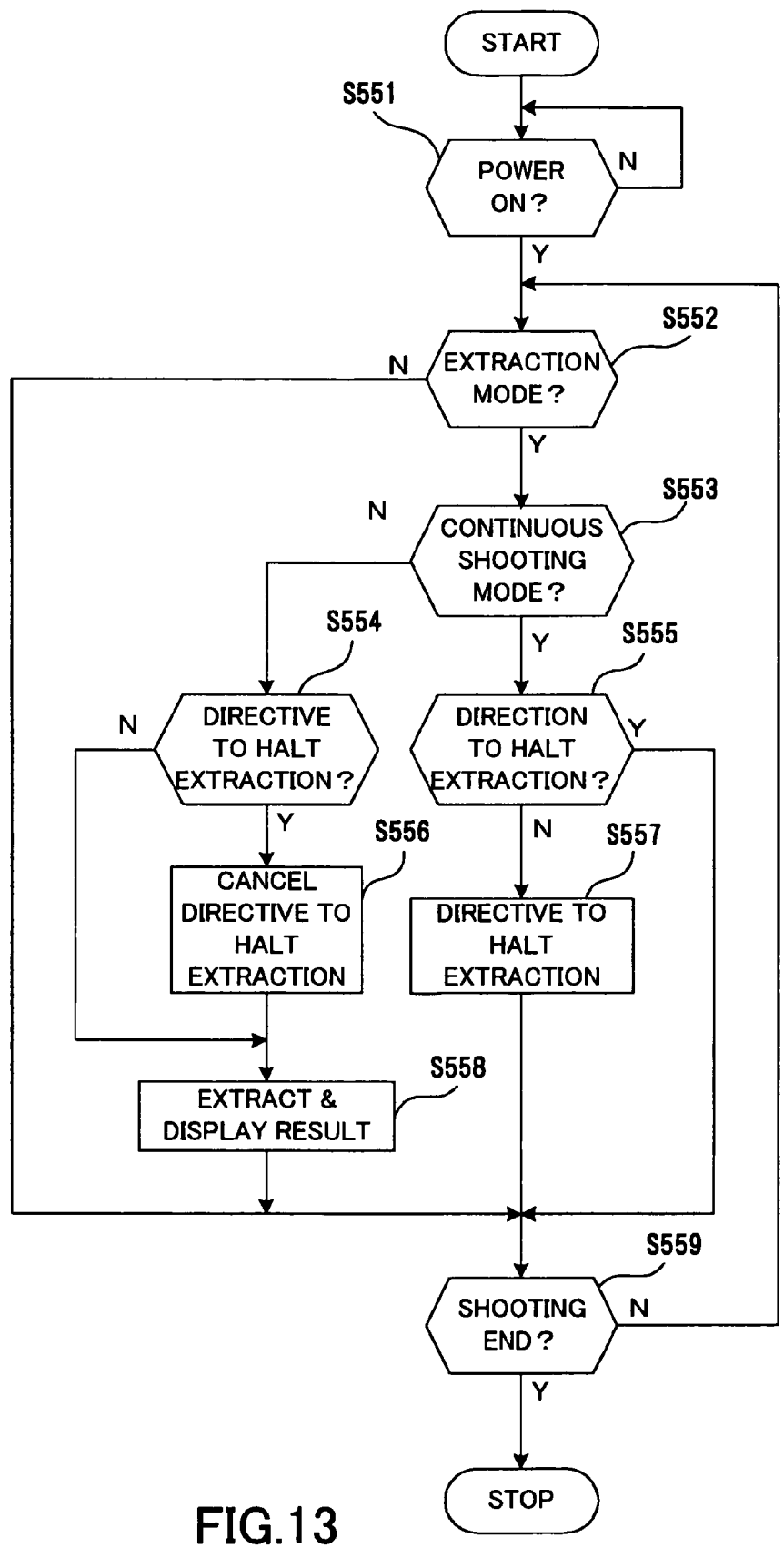
FIG. 13 is a flow chart describing other action sequence of the digital camera according to the present invention.

After checking in step S551 of FIG. 13 that the digital camera is turned on, it is judged in step S552 whether or not the mode is set to the extraction mode. When the extraction mode is not set, a flow proceeds to step S559 and when the extraction mode is set, a flow proceeds to step S553. In step S553, it is judged whether or not the continuous shooting mode is set. When the continuous shooting mode is not set, a flow proceeds to step S554 and when the continuous shooting mode is set, a flow proceeds to step S557. In step S554, it is judged whether or not the halt of the extraction is directed and when the halt thereof is not directed, a flow proceeds to S558 where a feature extracted from photographed image data is displayed on LCD monitor 109. After the extraction, a flow proceeds to step S559 where the shooting end is waited for. In step S554, when the halt of the extraction is directed, a flow proceeds to S556 where the halt of the extraction is cleared and proceeds to step S558.

When it is judged in step S553 that the continuous shooting mode is set, a flow proceeds to step S555 where it is judged whether or not the halt of the extraction is directed. When the halt is directed, a flow proceeds to step S559 where the shooting end is waited for and when the halt is not directed, a flow proceeds to step S557 where the halt of the extraction is directed and then proceeds to step S559. In step S559, it is judged whether or not the shooting action is ended and when the shooting action is not ended, a flow gets back to step S552 and when the shooting action is ended, this flow is ended. Like this, by not extracting the feature point at the time of the continuous shooting, the continuous shooting can be implemented at the same time interval as at the time of the normal continuous shooting.

Figure 14:
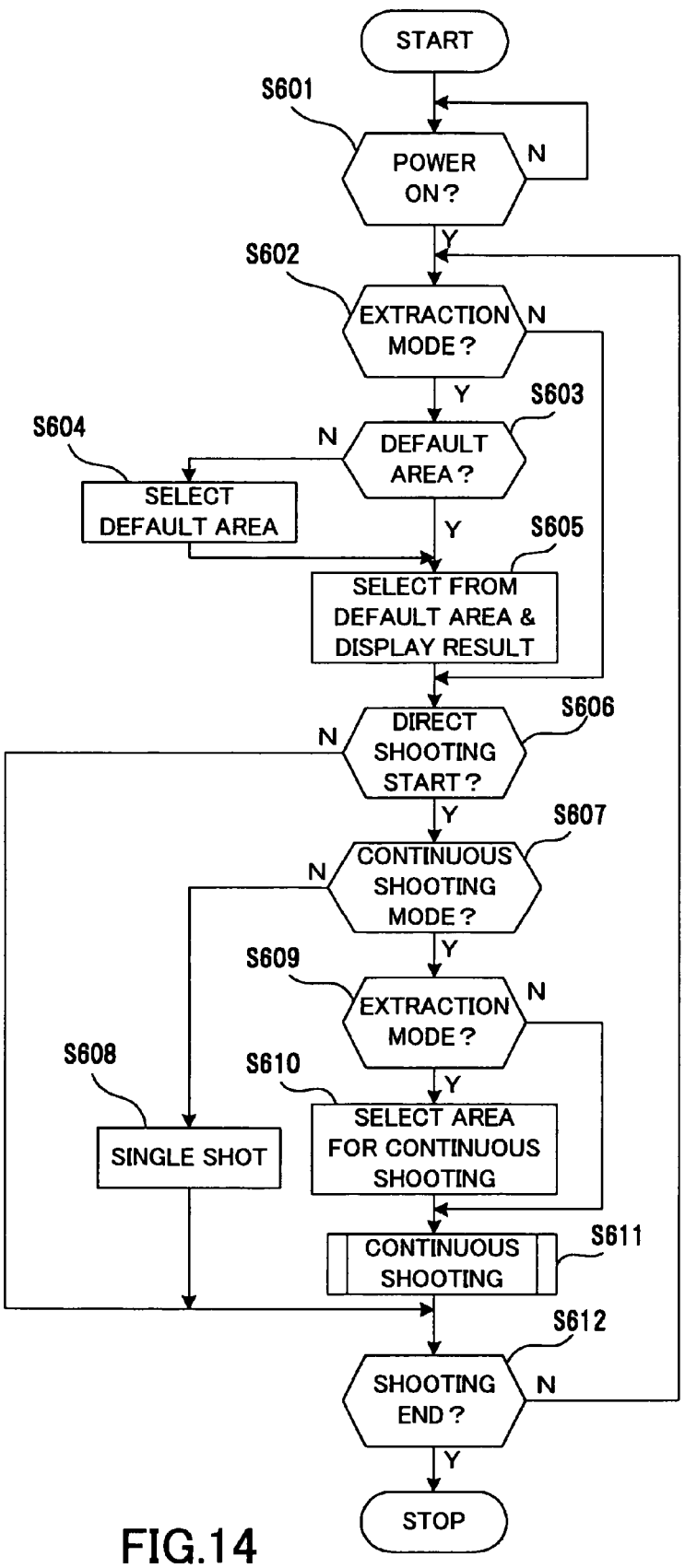
FIG. 14 is a flow chart describing other action sequence of the digital camera according to the present invention.

Next, a seventh and eighth embodiments will be described. In these embodiments, by not totally halting the feature point extraction, but by narrowing the extraction area for extracting the feature point, a time needed to extract the feature point can be shortened, thereby a longer shooting interval at the time of the continuous shooting being kept to a minimum. The seventh embodiment will be described in reference to FIGS. 14 to 16. FIG. 14 is a flow for changing the extraction area at the time of actually shooting when the continuous mode is set. In step S601, when it is checked that the digital camera is turned on, it is judged in step S602 whether or not the extraction mode is set. When the extraction mode is not set, a flow proceeds to step S606 and when the extraction mode is set, a flow proceeds to step S603. In step S603, it is checked whether or not an area for extracting a feature point is set to the default area that is vertically and laterally 80% area respectively of the center of the picture area. When the extraction area is set to the default area, a flow proceeds to step S605. When the extraction area is set to an area for extracting other in step S610 to be explained later, a flow proceeds to step S604. In step S604, the set extraction area is re-set to the default area and then a flow proceeds to step S605.

Figure 23:
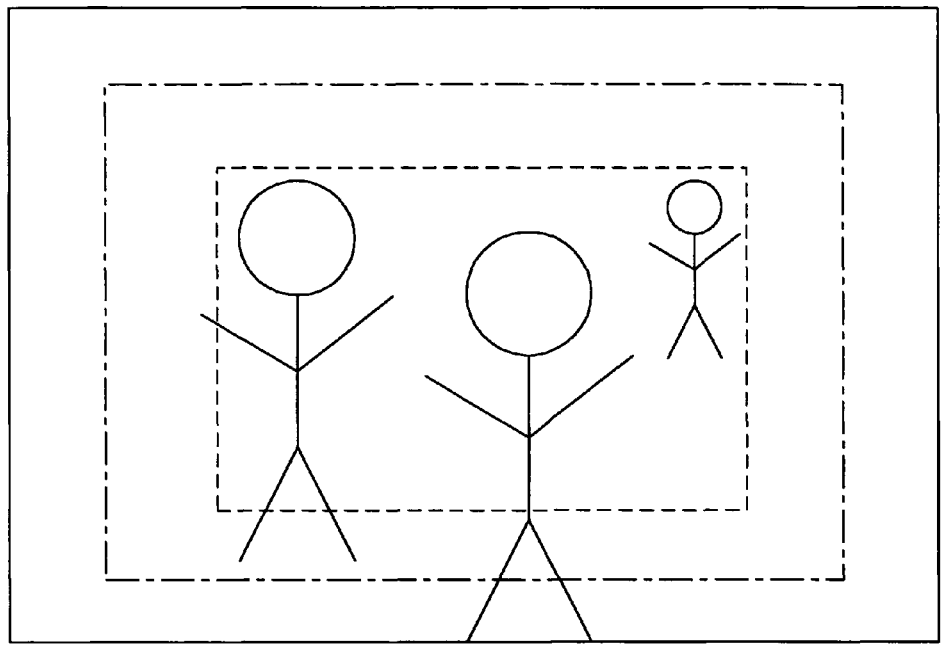
FIG. 23 is a view describing the extraction area.

In step S605, the feature point is extracted from the extraction area and its result is displayed on LCD monitor 109 by superimposing it on the shot image. In step S606, it is judged whether or not the shooting start is directed. The shooting start is directed by depressing full-depress SW 1163. When the shooting start is not directed, a flow proceeds to step S612 and when the shooting start is directed, a flow proceeds to step S607. In step S607, it is judged whether or not the continuous shooting mode is set. When the continuous shooting mode is not set, a flow proceeds to step S608 where the normal one frame picture is shot and then proceeds to step S612 after completing the one frame shooting. When the continuous shooting mode is set in step S607, a flow proceeds to step S609 where it is judged whether or not the extraction mode is set. When the extraction mode is not set, a flow proceeds to step S611 where the continuous shooting is implemented while full-depress SW 1163 is depressed. When the extraction mode is set, a flow proceeds to step S610 where an area for continuous shooting is selected in place of the default area for extraction. The area for continuous shooting will be described based upon FIGS. 23 and 10. In FIG. 23, the area represented by the dot line is the usually defaulted area and indicates the vertical/lateral 80% area respectively of the center of the picture screen. Contrary to this, at the time of the continuous shooting, the area represented by the broken line inside the default is the extraction area. This area is, for example, set on the order of vertical and lateral 40% area respectively of the center thereof. The reason why such the narrow area around the center is set as the extraction range is that it is based upon an assumption that, in many situations, the principal subject is positioned around the center area. Also, by way of FIG. 10, a method of setting the extraction area at other position other than the neighborhood of the center of the picture screen will be described. In FIG. 10, according to the seventh embodiment, the vertical/lateral 40% area respectively thereof including the area centering on the extracted principal subject is the extraction area in step S605. FIG. 10 shows that there are three subjects and the person at the center of the three is the principal subject, and the vertical/lateral 40% area respectively of the picture screen centering on the principal subject and represented by the broken line is the extraction area. Like this, with the extraction of the area around the principal subject, the principal subject is locked, and can be surely followed. Moreover, rather than the setting of the fixed size of the extraction area such as the 40% area and the like, for example, a vertical/lateral 50% large area respectively against a vertical/lateral size of the extracted principal subject may be set as the extraction area.

In step S611, the continuous shooting is implemented while depressing full-depress SW 1163. This continuous shooting will be explained in detail in FIG. 15. In step S612, it is judged whether or not the shooting mode of the digital camera is ended. The end of the shooting device that electric power SW 1161 is turned off or the mode is changed from the shooting mode to the playback mode for playing back the stored data and the like. When the shooting mode is not ended, a flow gets back to step S602 and when the shooting mode is ended, this flow is ended.

Figure 15:
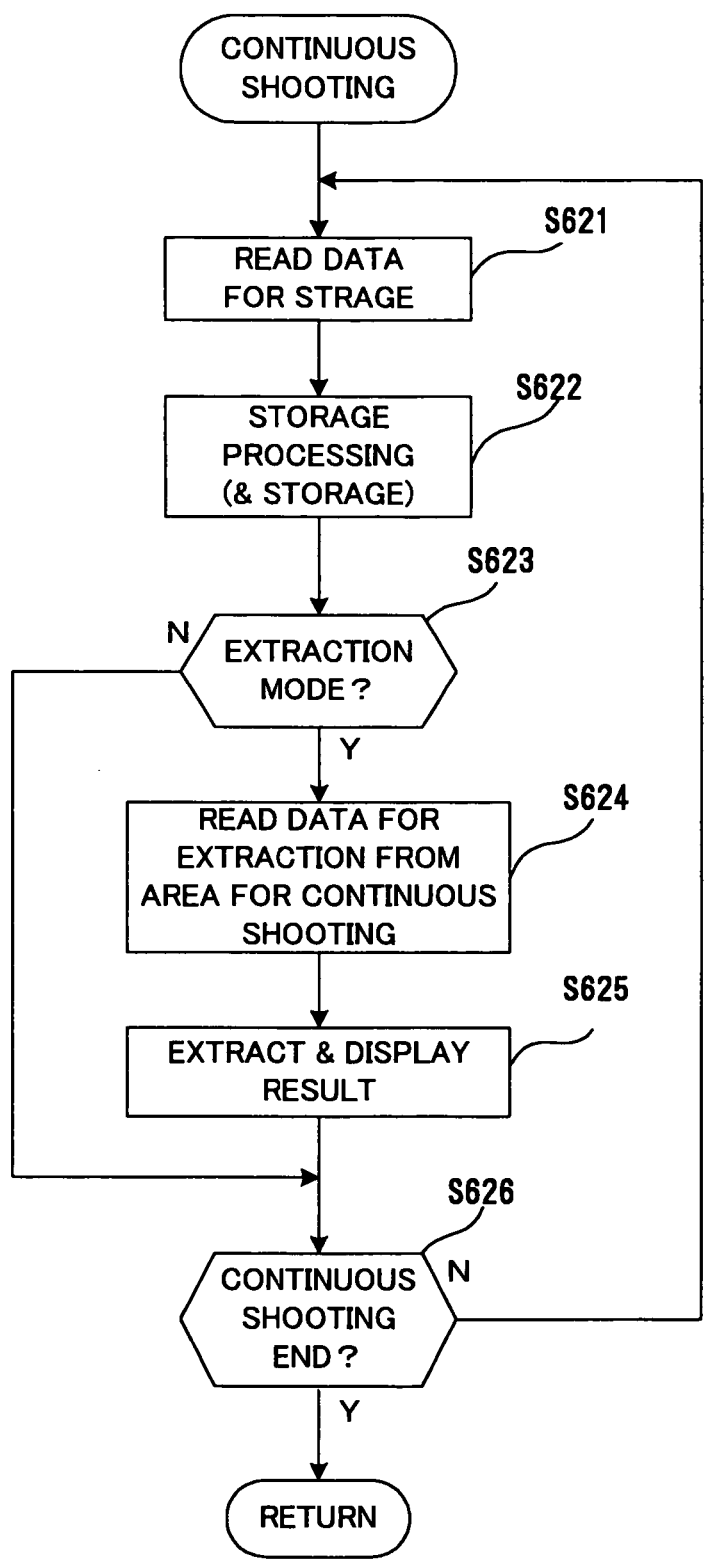
FIG. 15 is a flow chart describing other action sequence of the digital camera according to the present invention.
Figure 16:
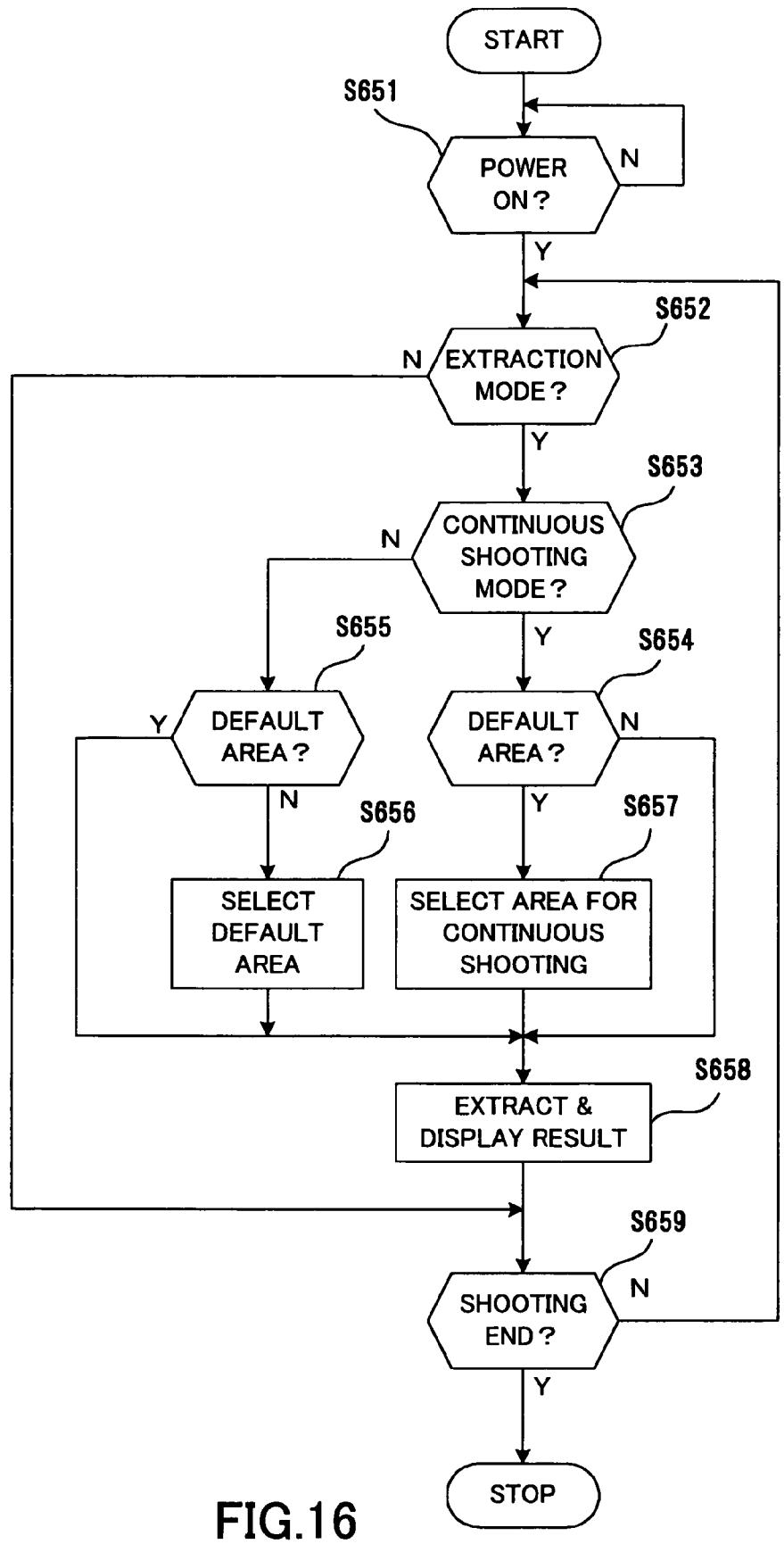
FIG. 16 is a flow chart describing other action sequence of the digital camera according to the present invention.

Referring to FIG. 15, the continuous shooting in step S611 of FIG. 14 will be described. In step S621 of FIG. 15, image data to be stored on storage medium 111 is read from imaging element 103 by depressing full-depress SW 1163. In step S622, analogue processing, A/D converting and digital processing are performed on the read image data and storing of the processed image data in storage medium 111 is started. In step S623, it is judged whether or not the mode is set to the extraction mode when the storing of the image data in storage medium 111 is started. When the extraction mode is not set, a flow proceeds to step S626 and when the extraction mode is set, in step S624, data for extraction is read from the selected extraction area for continuous shooting at the time of the continuous shooting. At this moment, as described before, the thinned-out pixels are read from the imaging element. In step S625, a predetermined feature is extracted from image data for extraction, and its result is displayed on LCD monitor 109. In step S626, it is judged whether or not full-depress SW 1163 is depressed and when SW 1163 is kept on depressed, a flow gets back to step S621 and when SW 1163 is not depressed, the continuous shooting is ended.

In this seventh embodiment, the feature point extraction area is changed only after the continuous mode is set and full-depress SW 1163 is depressed to start the shooting. Contrary to this, in a case where the principal subject is clearly recognizable or a display of the extraction result would annoy, the method of extracting the feature point may be changed or halted shortly after the continuous shooting mode is set. As an eighth embodiment, when the extraction mode is set at the time of the continuous shooting, a method of immediately changing the feature extraction area will be described based upon FIG. 16.

FIG. 23 shows an example of these extraction areas. In FIG. 23, the area represented by the dot line is the default area when the extraction mode is set and the area represented by the broken line inside the default area is set as the extraction area at the time of the continuous shooting mode. When it is checked in step S651 of FIG. 16 that the power of the camera is on, it is judged in step S652 whether or not the extraction mode is set. When the extraction mode is not set, a flow proceeds to step S659 and when the extraction mode is set, a flow proceeds to step S653. In step S653, it is judged whether or not the continuous shooting mode is set. When the continuous shooting mode is not set, a flow proceeds to step S655 and when the continuous shooting mode is set, a flow proceeds to step S654. In step S655, it is judged whether or not the extraction area is set to the default area. When the extraction area is set to the default area, a flow proceeds to step S658 and when the extraction area is not set to the default area, the default area is selected in step S656 and a flow proceeds to step S658. When the continuous shooting mode is set in step S563, it is judged in step S654 whether or not the extraction area is set to the default area. When the extraction area is set to the extraction area for continuous shooting, not to the default area, a flow proceeds to step S658 and when the extraction area is set to the default area, the area for continuous shooting is selected in step S657 and a flow proceeds to step S658. In step S658, the feature point is extracted from the predetermined area and the feature point is displayed on LCD monitor 109 together with the shot image. In step S659, it is judged whether or not the shooting mode is ended and when the shooting mode is not ended, a flow gets back to step S652 and this sequence is ended when the shooting mode is ended.

Figure 17:
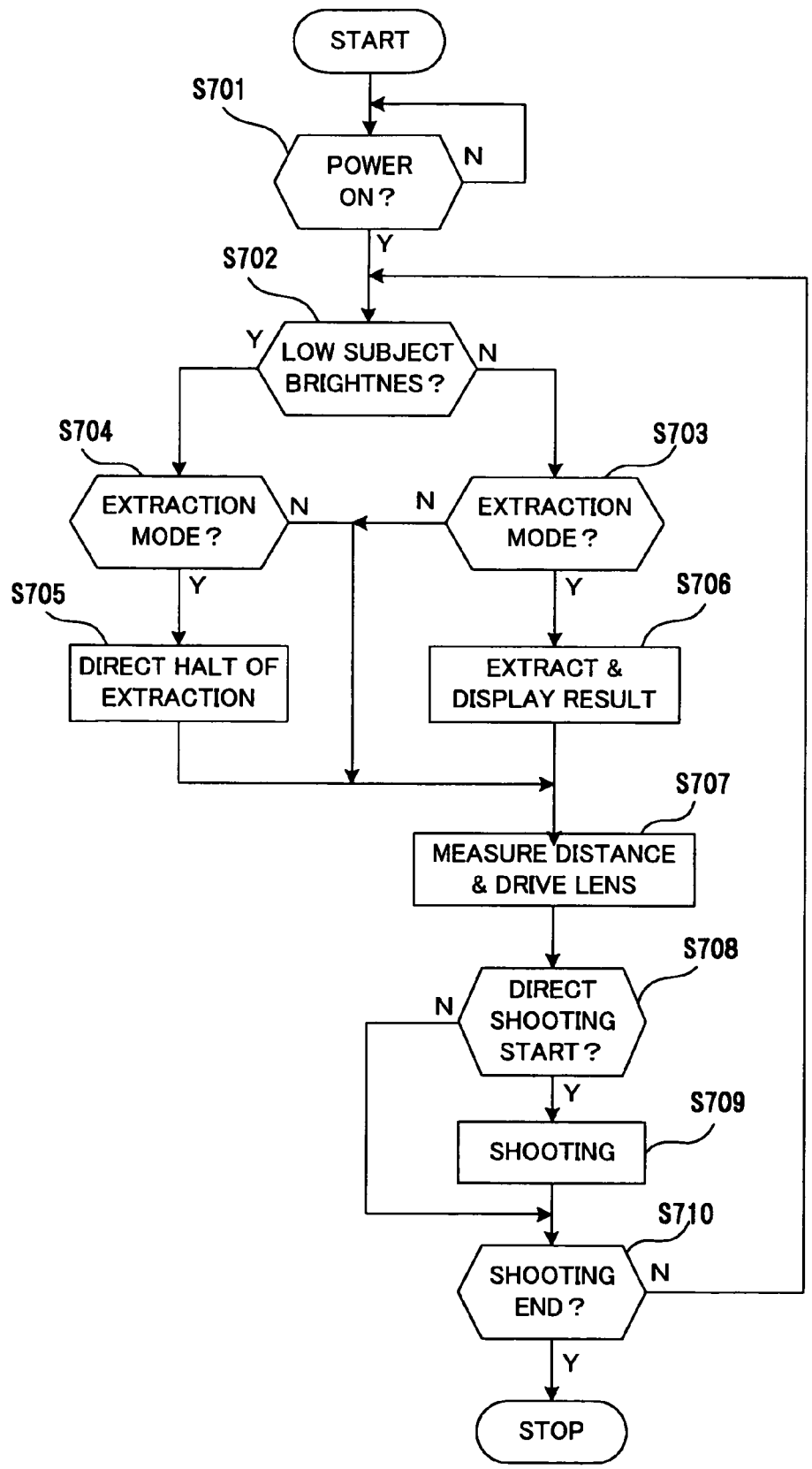
FIG. 17 is a flow chart describing other action sequence of the digital camera according to the present invention.
Figure 18:
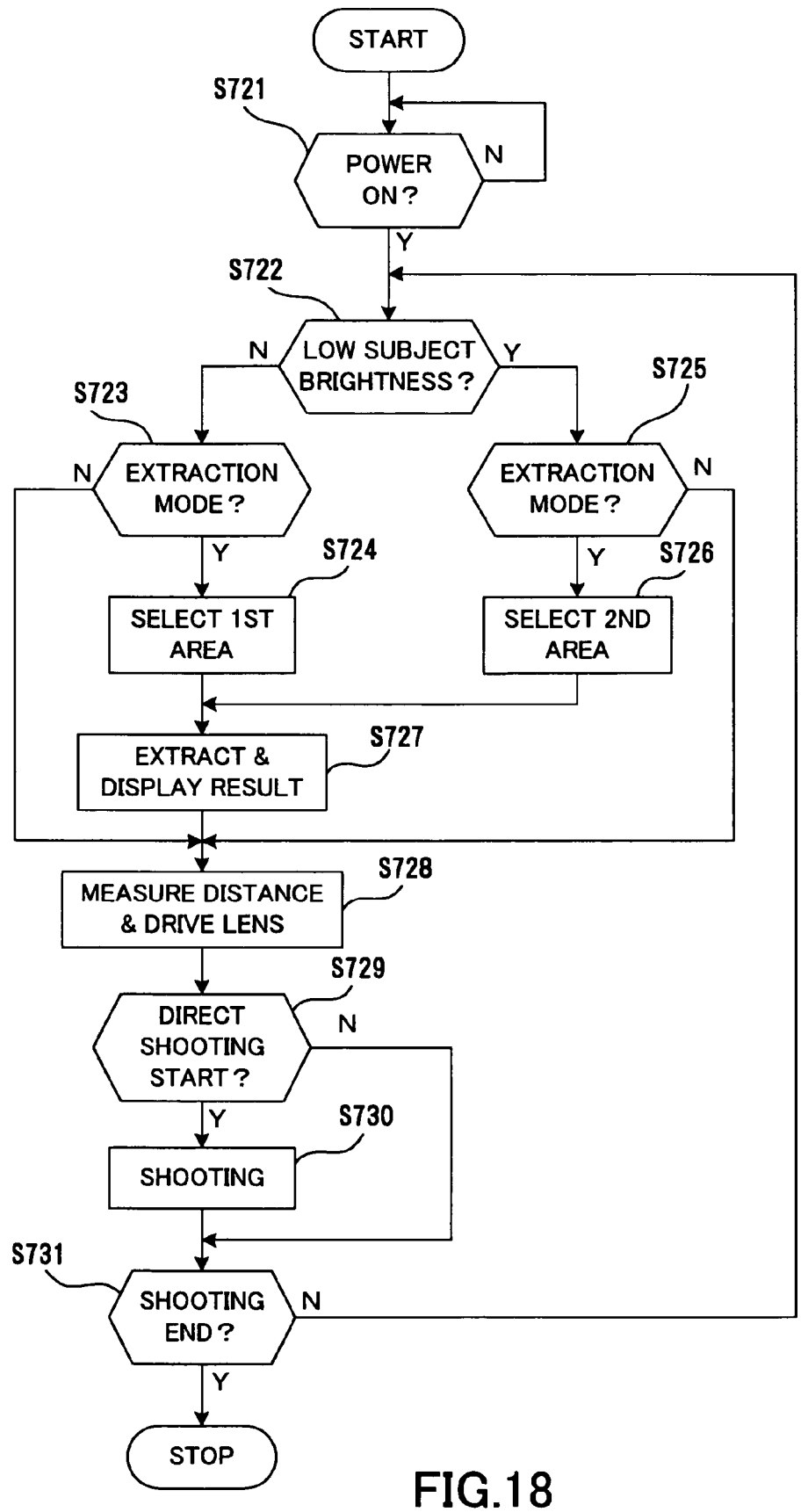
FIG. 18 is a flow chart describing other action sequence of the digital camera according to the present invention.

Fifth to eighth embodiments that have been described so far are embodiments that change the extraction method in relation to the continuous shooting mode. A camera function rather than the extraction action is again common with the one of fifth to eighth embodiments. Usually, when a subject is low in brightness, an accuracy of the feature point extraction is reduced or a computation cycle in computing AF to be described later is shortened. Moreover, as described before, with extraction processing, an overall processing speed of a camera is further reduced. FIG. 17 is a flow explaining a ninth embodiment in which the extraction is halted when the subject brightness is low and FIG. 18 is a flow explaining a tenth embodiment in which the extraction area is changed when the subject brightness is low. First, the ninth embodiment will be described. When the power of the digital camera is on in step S701, a flow proceeds to step S702 where the subject brightness is checked. When the subject brightness is not low, a flow proceeds to step S703 and when the brightness is low, a flow proceeds to step S704. How to check the subject brightness is to judge that the subject brightness is low when the subject brightness meets any of following four cases. 1. As a result of the AE computation, the subject brightness is judged to be below a predetermined value. 2. At a time of the shooting, the camera is set such that light is irradiated by strobe 117. 3. When a rate of the image data output from imaging element 103 is lower than a normal output rate. 4. An AF auxiliary flash as described before is used when computing AF. Herein the reason why the rate output from imaging element 103 referred to in 3 becomes low will be explained. As described before, in order to display the motion image on LCD monitor 109 before shooting, usually data of entire pixels of imaging element 103 is not used, but the image data of which a portion is thinned out beforehand is output from imaging element 103 at 30 frames per second. For the AF computation, this thinned-out image data is used. Namely, the normal AF computation is implemented at 30 frames per second. In this digital camera, when the subject brightness is too low to obtain sufficient image data from imaging element 103, the rate output from imaging element 103 is reduced to a 15 frame-per-second that is half the normal output rate. With this, an exposure time of imaging element 103 is lengthened, thereby increasing imaging sensitivity relatively. Thus, the subject is judged to be in the low brightness when the rate output from imaging element 103 becomes 15 f/sec. When any of these four cases takes place, the subject is judged to be in the low brightness.

In step S704, it is judged whether or not the extraction mode is set. When the extraction mode is not set, a flow proceeds to step S707 and when the extraction mode is set, a flow proceeds to step S705. In step S705, feature point-extraction-computation unit 1123 is directed not to extract the feature point and a flow proceeds to step S707. This enables to immediately measure a distance to the subject. When the subject brightness is not low, it is judged in step S703 whether or not the mode is set to the extraction mode. When the extraction mode is not set, a flow proceeds to step S707 and when the extraction mode is set, a flow proceeds to step S706. In step S706, the feature point of the subject is extracted and its result is displayed on LCD monitor 109 by superimposing it on the shot image. In step S707, the distance is measured by way of AF computation section 1124 and based upon its result, image-taking lens is driven. When the extraction mode is set at this moment, as image data to be used for the AF computation, the image data output from the imaging element used for extracting the feature point of the subject is used as it is. In step S708, it is judged whether or not full-depress SW 1163 is depressed and the shooting start is directed. When the shooting start is directed, a flow proceeds to step S709 where the picture is shot and then proceeds to step S710. When the shooting start is not directed, a flow proceeds to step S710. In step S710, it is judged whether or not the shooting is ended. When the shooting is not ended, a flow gets back to step S702 and the same cycle as in the foregoing is repeated using image data output from a new imaging element. Like this, the extraction or the extraction halt is directed corresponding to the subject brightness. When the shooting is ended in step S710, this sequence is ended.

A tenth embodiment in which an area for extracting the feature point is changed at low brightness will be described referring to FIG. 18. As described before, a S/N ratio of image data at the low brightness is reduced, so that it is most likely that a wrong extraction will occur. When the brightness is low, a photographer tends to place the subject around the center of the picture screen beforehand as much as possible. Thus, at the low brightness, by narrowing the area for the extraction more than the extraction area at the normal brightness and setting up the area for the extraction around the center of the screen, the wrong extraction against a marginal section can be avoided. In step S721 of FIG. 18, it is judged that the digital camera is turned on and in step S722, the subject brightness is judged. When the subject brightness is not low, a flow proceeds to step S723 and when the subject brightness is low, a flow proceeds to step S725. A method of judging whether or not the subject brightness is low is the same as in step S702 of FIG. 7. When it is judged that the subject brightness is not low, a flow proceeds to step S723 where it is judged whether or not the extraction mode is set. When the extraction mode is not set, a flow proceeds to step S728 and when the extraction mode is set, a flow proceeds to step S724. In step S724, the feature point of the subject is extracted from the vertical/lateral 80% area respectively of the picture screen defaulted for extracting the feature. Herein, this area is referred to as a first area. When it is judged in step S722 that the subject brightness is low, a flow proceeds to step S725 where it is judged whether or not the extraction mode is set. When the extraction mode is not set, a flow proceeds to step S728 and when the extraction mode is set, a flow proceeds to step S726. In step S726, a vertical/lateral 40% area respectively of the neighborhood of center within the picture screen is selected as the extraction area in the same way as the continuous shooting area described in step S610 of FIG. 14. Or when the principal subject is selected, the extraction area of the predetermined range centering on the principal subject is selected. Herein, any of these areas is referred to as a second area. In step S727, the feature point of the subject is selected from any of the selected first or second area and its extraction result is displayed on LCD monitor 109. In step S728, like step S707 of FIG. 17, the distance measuring is implemented by AF computation section 1124 and image-taking lens 101 is driven based upon its result. At this moment, when the extraction mode is set, as image data used for the AF computation, the image data output from imaging element used for extracting the feature point of a subject in step S727 is used as it is.

In step S729, it is judged whether or not the shooting start is directed by depressing full-depress SW 1163. When the shooting start is not directed, a flow proceeds to step S731 and when the shooting start is directed, a flow proceeds to step S730. In step S730, the subject is shot and a flow proceeds to step S731. In step S731, it is judged whether or not the shooting is ended. When the shooting is not ended, a flow gets back to step S722 where the same sequence is repeated based upon new image data. When the shooting is ended, this sequence is ended.

The ninth and tenth embodiments of FIGS. 17 and 18 show a solo flow of the extraction action at the low brightness. At the low brightness, auxiliary light is usually used to illuminate a subject having low brightness when implementing the AF computation. Next, an embodiment that links this auxiliary light used for the AF computation at the low brightness with the extraction action will be described. In the AF computation, when the subject brightness is low, the auxiliary light is irradiated onto the subject beforehand and the distance up to the subject is measured based upon reflection light therefrom. As a light source for AF auxiliary light, there cases where an electric discharge tube such as Xenon and the like illuminating the subject is used when actually shooting and a white LED arranged for auxiliary light separate from the electric discharge tube is irradiated. When the subject is illuminated with the white LED and the white LED is used at the actual shooting, it is possible to use the LED as the auxiliary light, too. An embodiment of the extraction action in the digital camera having these auxiliary light will be described using FIGS. 19 and 20.

Figure 19:
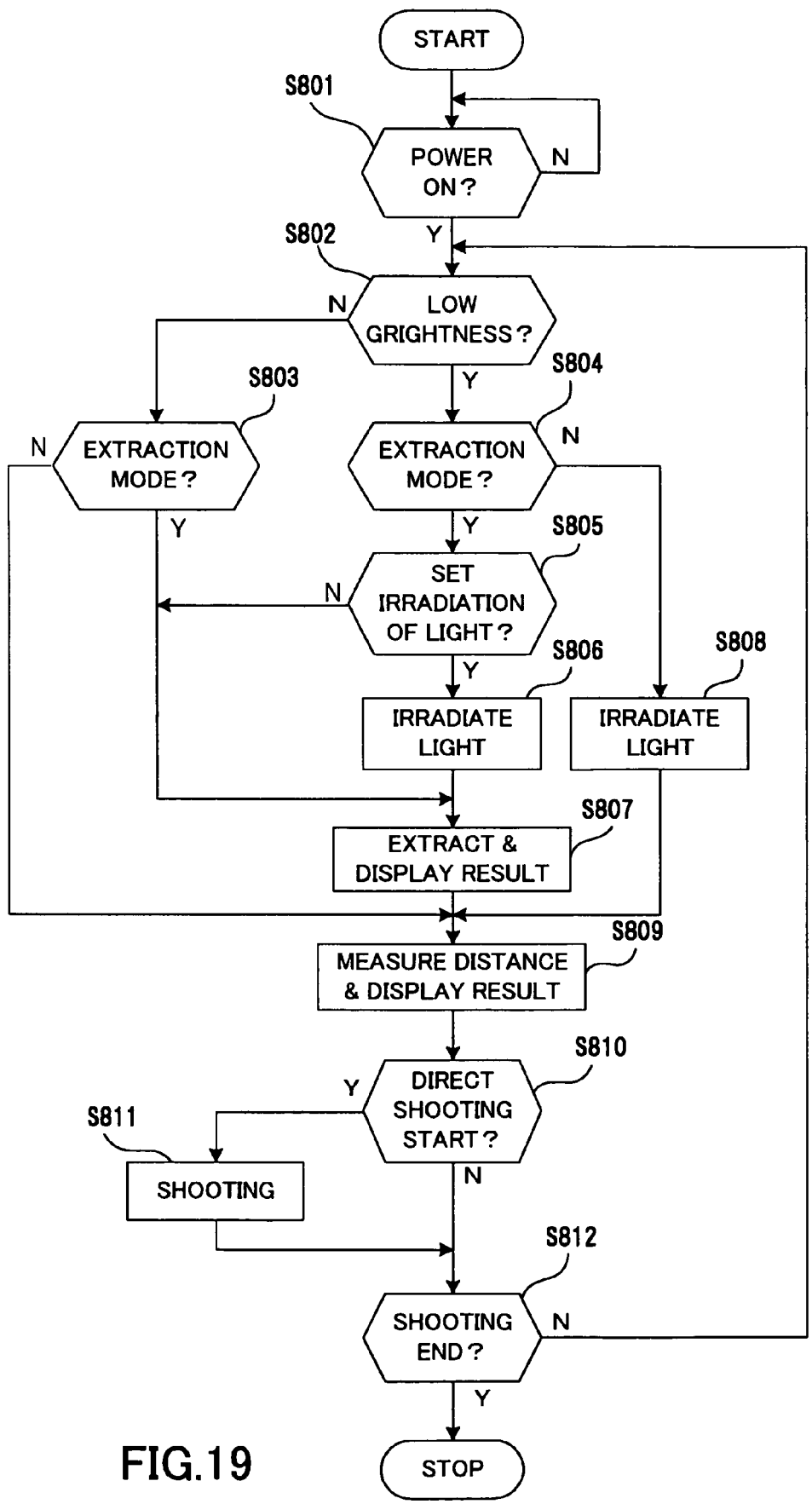
FIG. 19 is a flow chart describing other action sequence of the digital camera according to the present invention.

FIG. 19 shows an eleventh embodiment that achieves a digital camera capable of selecting whether or not the auxiliary light is irradiated for extraction at the low brightness. When the LED as described above is used as the auxiliary light, an irradiation range is affected by a direction of the LED, thereby affecting accuracy in the extraction. For example, if the LED auxiliary light is used when an area of a face of the subject is large, there is a case where only a portion of the face is illuminated due to a narrow irradiation range so that the wrong extraction occurs. In such the case, non-irradiation is set. Adversely, when there is a plurality of faces within the picture area, only a principal subject can be efficiently irradiated because of the narrow direction of the LED so that accuracy in the extraction of the subject becomes improved. An action flow based upon this is FIG. 9.

When it is checked in step S801 of FIG. 19 that the digital camera is turned on, the subject brightness is judged in step S802. When the subject brightness is not low, a flow proceeds to step S803 and when the brightness is low, a flow proceeds to step S804. A method of judging whether or not the subject brightness is low is the same as in step S702 of FIG. 17. When it is not judged that the brightness is low, a flow proceeds to step S803 where it is judged whether or not the extraction mode is set. When the extraction mode is not set, a flow proceeds to step S809 and when the extraction mode is set, a flow proceeds to step S807. When the subject brightness is low in step S802, it is judged in step S804 whether or not the extraction mode is set. When the extraction mode is not set, a flow proceeds to step S808 where the auxiliary light is irradiated onto the subject and a flow proceeds to step S809. In step S809, the distance is computed based upon the reflection light from the subject and the image-taking lens is driven based upon its result. When the extraction mode is set in step S804, a flow proceeds to step S805 where it is judged whether or not the auxiliary light is set to be irradiated. A photographer sets to irradiate the auxiliary light by way of a selection menu displayed on LCD monitor 109 with setting button 1164 (not shown). When the photographer sets nothing, a default is set so as to irradiate the auxiliary light.

When it is judged in step S805 that a non-irradiation of the auxiliary light is set by the photographer because of the above-mentioned reason, a flow proceeds to step S807 where the extraction is implemented without irradiating the auxiliary light. When the irradiation of the auxiliary light is set in step SS805, a flow proceeds to step S806 where the auxiliary light is irradiated onto the subject and the feature point is extracted in step S807 using image data obtained from the irradiation, and its extraction result is displayed on LCD monitor 109. When the extraction mode is set, in step S809, the AF computation is implemented using image data output from imaging element 103 used for extraction as it is, and image-taking lens 101 is driven based upon its computation result. When the extraction mode is not set, the normal AF action, namely, the AF computation is implemented with the irradiation of the auxiliary light when the subject brightness is low. Like this, when the LED is used as the auxiliary light for the AF computation purpose only, there is no problem with the AF computation even if only a portion of a shot image is irradiated due to the direction of the LED. In step S805, when the non-irradiation of the auxiliary light is set, the extraction might be impossible in step S807 due to the low subject brightness and in such the case, what the extraction is impossible is displayed on LCD monitor 109.

In step S810, it is judged whether or not the shooting start is directed by depressing full-depress SW 1163. When SW 1163 is depressed, a flow proceeds to step S811 where a picture is shot and then, a flow proceeds to step S812. When the shooting start is not directed in step S810, a flow proceeds to step S812. In step S812, it is judged whether or not the shooting is ended and when the shooting is not ended, a flow gets back to step S802 where the same sequence is repeated based upon new image data. When the shooting is ended, this sequence is ended. The flow described in FIG. 19 shows a case of selecting whether or not the auxiliary light for extraction is irradiated onto the subject at the low brightness, and this flow is an action basically independent from the action of the distance measuring. FIG. 19 describes the case where the method of measuring the distance is the AF distance measuring, but the method of measuring the distance is not limited to the AF and a manual distance measuring may be used. In such the case, the auxiliary light for extraction is naturally not irradiated.

As the image data for extracting the subject, image data output from the imaging element at the same time as image data used for AF is used so that the wrong extraction might occur depending upon a subject. FIG. 19 describes the embodiment of whether or not the irradiation of the auxiliary light for extraction is set corresponding to the subject. Contrary to this, FIG. 20 shows a twelfth embodiment that achieves a digital camera capable of selecting whether or not image data irradiated by the auxiliary light at the low brightness is used as image data for extraction.

Figure 20:
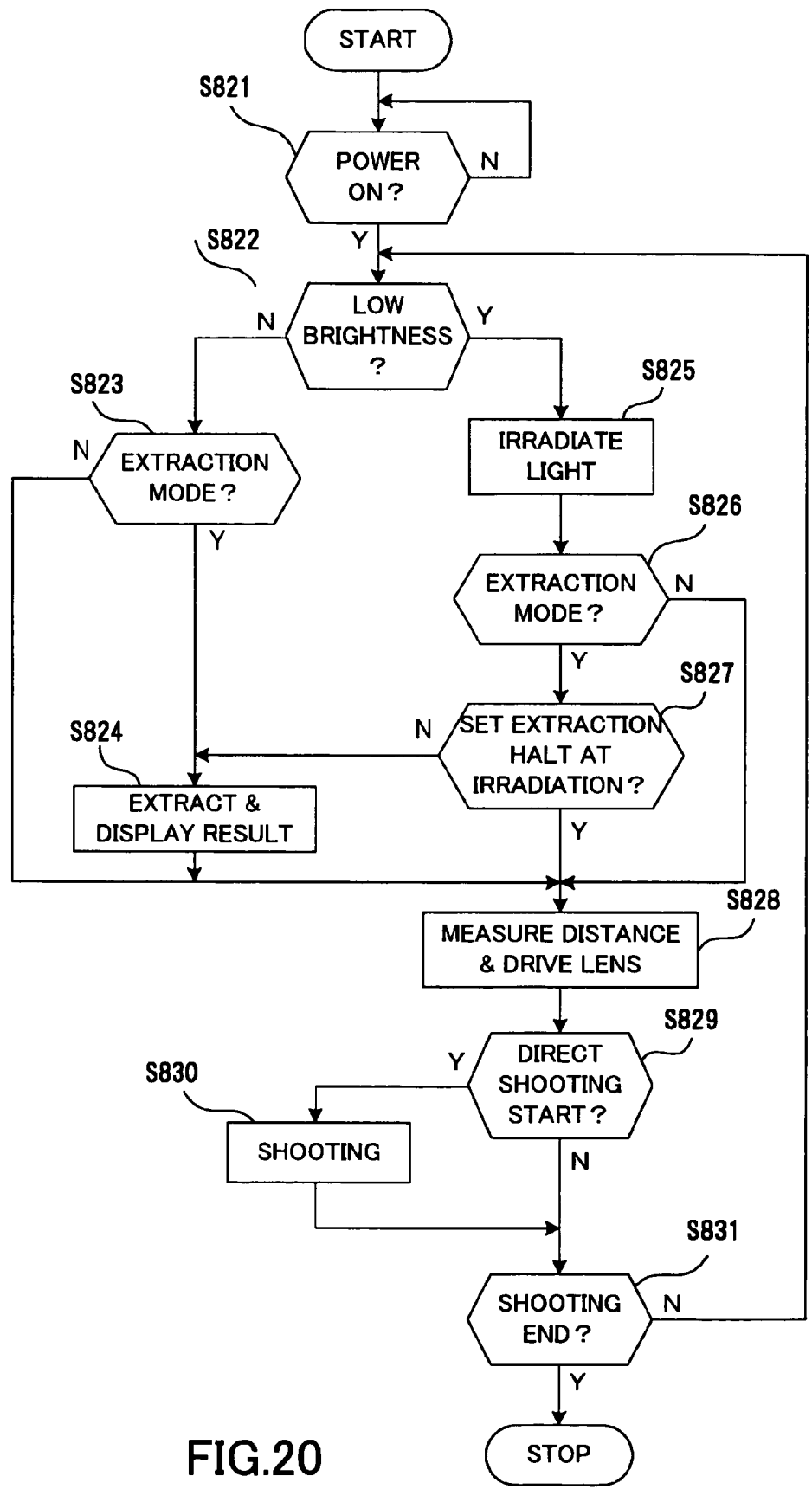
FIG. 20 is a flow chart describing other action sequence of the digital camera according to the present invention.

When it is checked in step S821 of FIG. 20 that the camera power is turned on, the subject brightness is judged in step S822. When the subject brightness is not low, a flow proceeds to step S823 and when the subject brightness is low, a flow proceeds to step S825. This method of judging whether or not the subject is low is the same as in step S702 of FIG. 17. When it is not judged that the subject brightness is low, a flow proceeds to step S823 where it is judged whether or not the extraction mode is set. When the extraction mode is not set, a flow proceeds to step S828 and when the extraction mode is set, a flow proceeds to step S824. In step S824, the feature point of the subject is extracted and its feature point is displayed on LCD monitor 109, and then a flow proceeds to step S828. When the subject is judged to be low in step S822, a flow proceeds to step S826 after the auxiliary light is irradiated in step S825. In step S826, it is judged whether or not the extraction mode is set. When the extraction mode is not set, a flow proceeds to step S828 and when the extraction mode is set, a flow proceeds to step S827. In step S827, it is judged whether or not the feature point extraction is set such that the feature point is extracted by use of image data irradiated by the auxiliary light. When the feature point extraction is so set, a flow proceeds to step S824 where the feature point of the subject is extracted. At this moment, when the photographer sets nothing, the default is set such that the feature point is extracted by the default setting. When it is set such that the irradiated image data is not used for extraction, a flow proceeds to step S828 where the AF computation is shortly implemented and image-taking lens 101 is driven based upon the computation result. In step S829, it is judged whether or not the shooting start is directed by depressing full-depress SW 1163. When the shooting start is directed, a flow proceeds to step S830 where the picture is shot and then proceeds to step S831. When the shooting start is not directed instep SS829, a flow proceeds to step S831. In step S831, it is judged whether or not the shooting is ended and when the shooting is not ended, a flow gets back to step S822 where the same sequence is repeated based upon new image data. When the shooting is ended, this sequence is ended.

Figure 21:
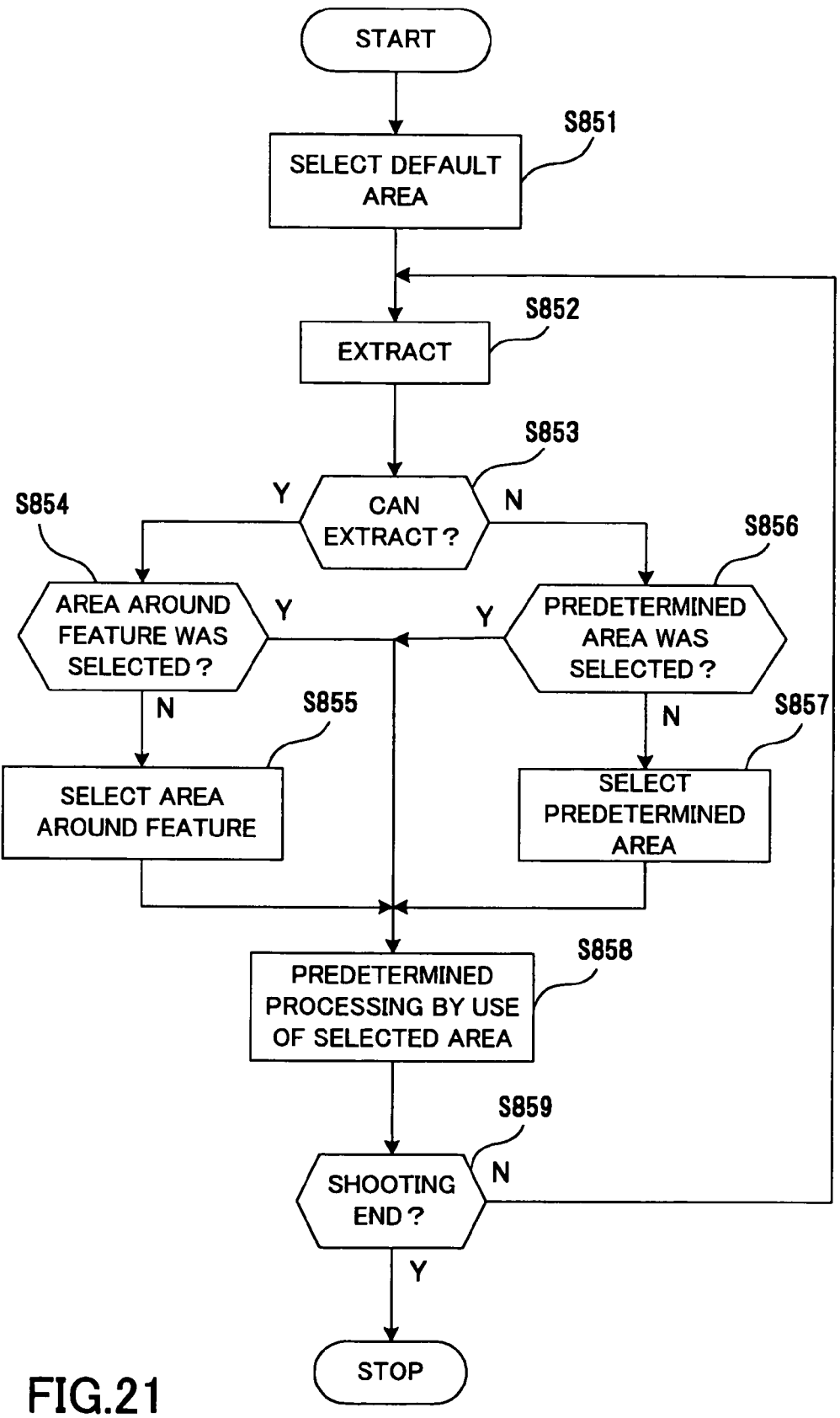
FIG. 21 is a flow chart describing that the AF or AE area is selected in accordance with the extraction result.
Figure 24:
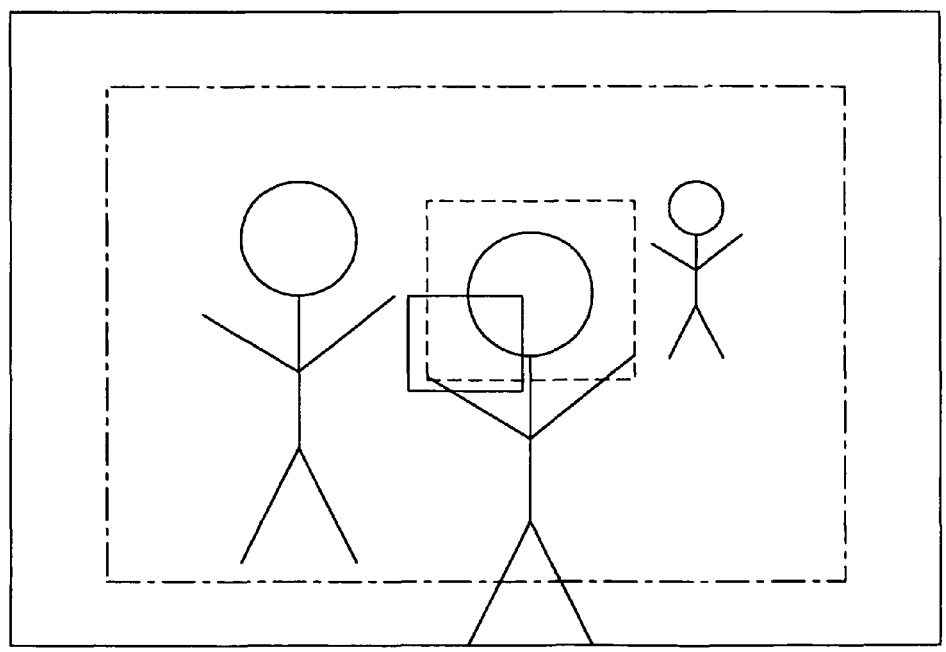
FIG. 24 is a view describing the extraction, AF and AE areas.

Regarding the extracted feature point according to the above-mentioned embodiments, by setting an area around the feature as an AF area or an AE area, a photograph can be taken with a focus position or an exposure in compliance with the photographer's intention. On the other hand, when extracting the feature point, there are cases where the extraction cannot be implemented due to a size, a directive, a tilt of the subject and the like other than the subject brightness. In such the case, it is necessary that a predetermined processing be immediately performed by selecting a pre-set normal AF area or AE area. FIG. 21 shows a flow to select the suitable area corresponding to whether or the feature point can be extracted at processing AF or AE. This flow is similarly applied to the fifth to twelfth embodiments, which have been described so far. In step S851 of FIG. 21, first, an initial area is selected to extract the feature point. This initial area is, for example, the vertical/lateral 80% area respectively of the picture area represented by the dot line shown in FIG. 24. In step S852, the feature point within the initial area represented by the dot line is extracted. In step S853, it is judged whether or not the feature point is extracted. When the feature point is not extracted, a flow proceeds to step S856 and when the feature point is extracted, a flow proceeds to step S854. In step S854, it is judged whether or not the area around the extracted feature point is selected as the AF or AE area. When the area is selected, a flow proceeds to step S858 and when the area is not selected, a flow proceeds to step S855 where a predetermined area around the extracted feature point is selected as the AF or AE area and then proceeds to step S858. FIG. 24 shows a display example in a case where the area around the extracted feature point is selected as the AF or AE area. In FIG. 24, the predetermined area including a face of a principal person in the middle of three persons on hand is displayed with the broken line as the AF or AE area.

In step S853, when the extraction of the feature point cannot be implemented, a flow proceeds to step S856 where it is judged whether or not the predetermined area is selected as the AF or AE area. When the area is so selected, a flow proceeds to step S858 and when the area is not so selected, a flow proceeds to step S857 where the predetermined area is selected and then proceeds to step S857. The predetermined area herein is an area set in advance as a default and the predetermined area at the center represented with the solid line in FIG. 25 is set as the AF and AE areas. In step S858, the AF or AE computation is implemented based upon an output from the area around the extracted feature point or the predetermined area set as the default and the focus lens is driven, and a shutter speed and an exposure value at shooting are determined. In step S859, it is judged whether or not the shooting is ended and when the shooting is not ended, a flow gets back to step S852 and when the shooting is ended, this sequence is ended. Anyway, as described before, data at the same time output from imaging element 103 is used for computing the AF and processing an extraction, and moreover the same data as the one output for processing the extraction is also used even when implementing the AE computation so that the output from imaging element 103 can be efficiently used.

Figure 22:
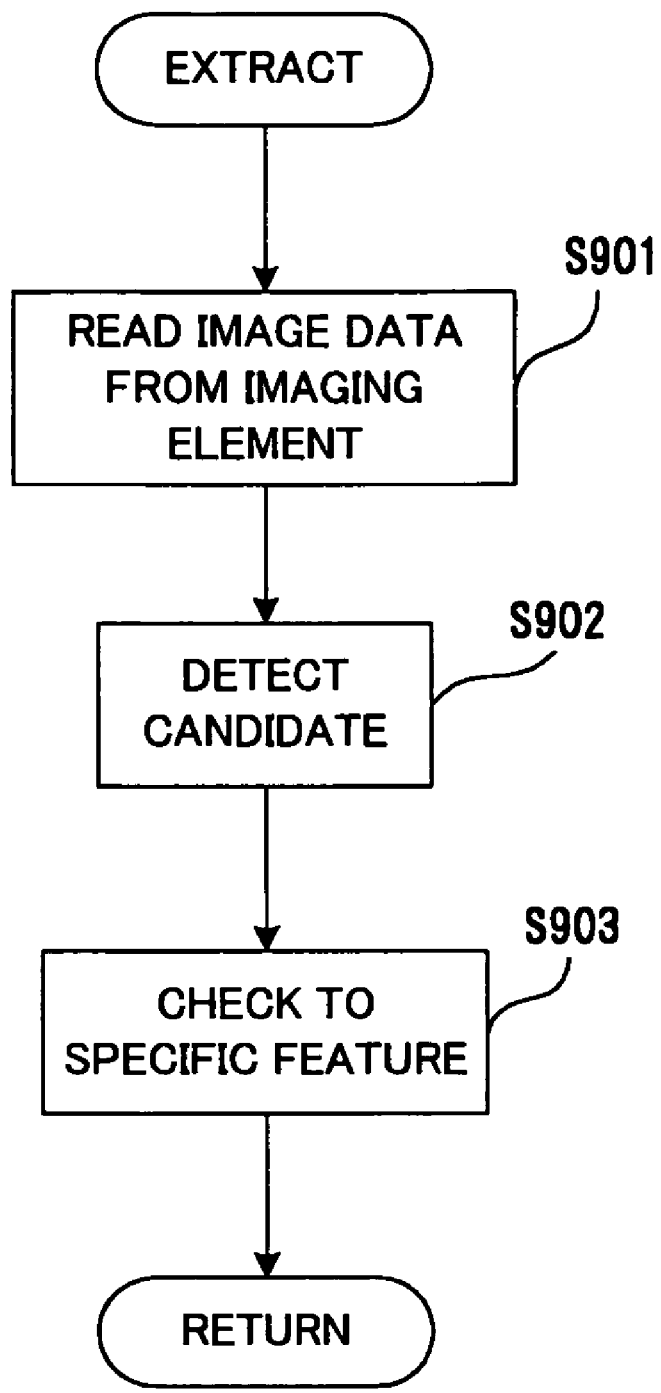
FIG. 22 is a flow chart describing a step of the extraction action.

Now, a brief step of the extraction action, which has been described, will be described based upon FIG. 22. In step S901 of FIG. 22, image data thinned out from imaging element 103 for extracting the feature point is read to VRAM 107 and the vertical/lateral 80% range of the center is written into buffer memory 105. In step S902, feature-point-extraction section 1123 extracts candidates capable of becoming a feature point within the picture from the image data. With this, a number of faces, its positions, sizes of them and the like are detected. Then, in step S903, the detected face in step S902 is compared to a feature point of a particular face specified beforehand by the photographer prior to the shooting from feature points of a plurality of faces stored on storage section 1125 as database, and the feature point meeting each other is detected. Regarding this feature-point-extraction computation, a well-known Gabor wavelet conversion and the like is used.

Halting the foregoing extraction action so far includes not only halting all the steps from S901 to S903 but also halting only a part of a latter half thereof. For example, in any of cases where only step S903 is not implemented, steps S902 and S903 are not implemented, and steps from S901 to S903 are not implemented, it is expressed by an extraction halt.

What is claimed is:

1. A digital camera comprising:
   an imaging device that photographs a subject;
   an extraction device that extracts a predetermined feature portion within image data output from the imaging device;
   a judging device that judges brightness of the subject; and
   a selecting device that selects a first extraction area of an image when the brightness of the subject is above a threshold value, and selects a second extraction area of the image when the brightness of the subject is below the threshold value, the second extraction area being smaller than the first extraction area wherein the extraction device extracts the predetermined feature portion from the selected extraction area of the image of the image data in accordance with the brightness of the subject judged by the judging device.

2. The digital camera as set forth in claim 1, further comprising:
   a focus device that performs a focusing operation with respect to the subject, using the image data output from the imaging device; and
   a focus control device that determines a position of an AF area, based on the predetermined feature portion extracted by the extraction device, and controls the focus device so as to perform the focusing operation.

* * * * *

UNITED STATES PATENT AND TRADEMARK OFFICE
CERTIFICATE OF CORRECTION

| | | |
|---|---|---|
| PATENT NO. | : 8,120,664 B2 | |
| APPLICATION NO. | : 11/050909 | |
| DATED | : February 21, 2012 | |
| INVENTOR(S) | : Hirotake Nozaki et al. | |

It is certified that error appears in the above-identified patent and that said Letters Patent is hereby corrected as shown below:

Please amend the 3rd Inventor's city of residence as follows:

Item (75), please change "Yamoto (JP)" to --Yamato (JP)--.

Signed and Sealed this
Eighth Day of May, 2012

David J. Kappos
*Director of the United States Patent and Trademark Office*